(12) United States Patent
Campbell et al.

(10) Patent No.: US 8,480,407 B2
(45) Date of Patent: Jul. 9, 2013

(54) TISSUE-MIMICKING PHANTOM FOR PROSTATE CANCER BRACHYTHERAPY

(75) Inventors: Gordon Campbell, London (CA); Victoria Homblower, Winnipeg (CA)

(73) Assignee: National Research Council of Canada, Ottawa, Ontario (CA)

( * ) Notice: Subject to any disclaimer, the term of this patent is extended or adjusted under 35 U.S.C. 154(b) by 916 days.

(21) Appl. No.: 12/461,410

(22) Filed: Aug. 11, 2009

(65) Prior Publication Data

US 2010/0041005 A1 Feb. 18, 2010

Related U.S. Application Data

(60) Provisional application No. 61/136,128, filed on Aug. 13, 2008.

(51) Int. Cl.
*G09B 23/28* (2006.01)
(52) U.S. Cl.
USPC .......................................................... 434/272
(58) Field of Classification Search
USPC ... 434/262, 267, 272, 273, 295, 296; 600/437
See application file for complete search history.

(56) References Cited

U.S. PATENT DOCUMENTS

| | | | |
|---|---|---|---|
| 4,277,367 A | 7/1981 | Madsen et al. | |
| 4,286,455 A | 9/1981 | Ophir et al. | |
| 4,331,021 A | 5/1982 | Lopez et al. | |
| 4,843,866 A | 7/1989 | Madsen et al. | |
| 5,196,343 A | 3/1993 | Zerhouni et al. | |
| 5,625,137 A | 4/1997 | Madsen et al. | |
| 5,656,763 A | 8/1997 | Flax | |
| 5,902,748 A | 5/1999 | Madsen et al. | |
| 5,981,826 A * | 11/1999 | Ku et al. | 623/23.72 |
| 5,994,900 A | 11/1999 | Gurvich | |

(Continued)

FOREIGN PATENT DOCUMENTS

WO   WO 02-40985   5/2002

OTHER PUBLICATIONS

D'Souza et al, "Tissue mimicking materials for a multi-imaging modality prostate phantom", Medical Physicas, vol. 28, No. 4, pp. 688-700, Apr. 2001 [retrieved online Oct. 18, 2012].*

(Continued)

*Primary Examiner* — Kurt Fernstrom
(74) *Attorney, Agent, or Firm* — Jason Davis

(57) ABSTRACT

A phantom for prostate cancer brachytherapy has a prostate tissue phantom shaped like a real prostate gland, a perineal tissue phantom surrounding the prostate tissue phantom, a skin tissue phantom separating the perineal tissue phantom from an outside environment, and an enclosure. The prostate tissue phantom is a polyvinyl alcohol cryogel (PVA-C) having undergone 3-5 freeze-thaw cycles and having 10-20% w/w PVA in a solvent (e.g. water), 4-8% w/w oil and an amount of acoustic scattering particles to ultrasonically distinguish the prostate-tissue phantom from its surroundings. The perineal tissue phantom is a PVA-C having undergone 1-2 freeze-thaw cycles and having 10-20% w/w PVA in a solvent, 4-8% w/w oil and an amount of acoustic scattering particles to ultrasonically distinguish the perineal tissue phantom from its surroundings. The skin tissue phantom is a PVA-C having undergone at least 6 freeze-thaw cycles and having 15-25% w/w PVA in a solvent. The phantom mimics the imaging and mechanical properties of the prostate and surrounding tissues, providing a realistic phantom for prostate cancer brachytherapy.

16 Claims, 9 Drawing Sheets

U.S. PATENT DOCUMENTS

| | | | |
|---|---|---|---|
| 6,318,146 | B1 | 11/2001 | Madsen et al. |
| 6,352,860 | B1 | 3/2002 | Madsen et al. |
| 6,635,486 | B2 | 10/2003 | Madsen et al. |
| 6,775,404 | B1 | 8/2004 | Pagoulatos et al. |
| 7,419,376 | B2 * | 9/2008 | Sarvazyan et al. ............ 434/273 |
| 7,427,199 | B2 * | 9/2008 | Sakezles ....................... 434/267 |
| 7,462,488 | B2 * | 12/2008 | Madsen et al. ..................... 436/8 |
| 7,544,062 | B1 * | 6/2009 | Hauschild et al. ............ 434/267 |
| 7,776,352 | B2 * | 8/2010 | Ruberti et al. ................ 424/423 |
| 2002/0012999 | A1 | 1/2002 | Madsen et al. |
| 2004/0067591 | A1 | 4/2004 | Madsen et al. |
| 2008/0064072 | A1 * | 3/2008 | Wan et al. ..................... 435/101 |
| 2008/0076101 | A1 * | 3/2008 | Hyde et al. .................... 434/272 |
| 2010/0179428 | A1 * | 7/2010 | Pedersen et al. ............. 600/443 |
| 2010/0198063 | A1 * | 8/2010 | Huber et al. .................. 600/437 |
| 2011/0291321 | A1 * | 12/2011 | Chan et al. .................... 264/222 |

OTHER PUBLICATIONS

Surrey et al, "Poly(vinyl alcohol) cryogel phantoms for use in ultrasound and MR imaging", Phys. Med. Biol. 49 (2004) pp. 5529-5546 [retrieved online Oct. 18, 2012].*
Fromageau, J. et al. IEEE Transactions on Ultrasonics, Ferroelectrics, and Frequency Control. vol. 54, No. 3, pp. 498-509 (2007).
Hassan, CM et al. Advances in Polymer Science. vol. 153, pp. 37-65 (2002).
Podder, TK et al, 2005 IEEE International Workshop on Robots and Human Interactive Communication. pp. 66-72 (2005).
Madsen, EL et al. Med. Phys. vol. 5, No. 5, pp. 391-394 (1978).
Berry, E. et al. Proc Instn Mech Engrs vol. 216 Part H: J Engineering in Medicine. pp. 211-214 (2002).
Berry, E. et al. Med. Eng. Phys. vol. 19, No. 1, pp. 90-96 (1997).
Wan, WK et al. Optimizing the Tensile Properties of Polyvinyl Alcohol Hydrogel . . . J. Biomed. Mater. Res .(Applied Biomater). 63:854-861 (2002).
Stauffer, SR et al. Polymer. vol. 33, No. 18, pp. 3932-3936 (1992).
Peppas, NA et al. Journal of Controlled Release. vol. 16, pp. 305-310 (1991).
Bray, JC et al. J. Biomed. Mater. Res. vol. 7, pp. 431-443 (1973).
Madsen, EL et al. Ultrasound in Med. & Biol. vol. 24, No. 4, pp. 535-542 (1998).
Mitchell, MD et al. Magnetic Resonam Imaging. vol. 4, pp. 263-266 (1986).
Paliwal, BR et al. Int. J. Radiation Oncology Biol. Phys. vol. 42, No. 1, pp. 205-211 (1998).
D'Souza, WD et al. Med. Phys. vol. 28, No. 4, pp. 688-700 (2001).
Parker, KJ et al. 1993 IEEE Ultrasonics Symposium. pp. 1035-1038 (1993).
Lockwood, GR et al. Ultrasound in Med. & Biol. vol. 17, No. 7, pp. 653-666 (1991).
Chivers, RC et al. Ultrasound in Med. & Biol. vol. 2, pp. 25-29 (1975).
Greenleaf J et al. Ultrasonic data acquisition and processing system for atherosclerotic tissue characterization. Proc. 1074 Ultrasonic Sump, pp. 738-743 (1974).
CIRS Model 053-I Ultrasound Prostate Training Phantom product specification. pp. 125-126.
Campbell, G. et al. Proceedings of 2002 NRC-NSC Canada-Taiwan Joint Workshop on Advanced Manufacturing Technologies, pp. 137-144 (2002).
AIUM (American institute of ultrasound in medicine). Methods for Specifying Acoustic Properties of Tissue Mimicking Phantoms and Objects, (1995).
National Cancer Institute of Canada: Canadian Cancer Statistics. pp. 51 and 56 (2002).
Abstract of Merrick, GS et al. Tech Urol. Mar; 7(1):12-9 (2001).
Abstract of Blasko, JC et al. Semin Radiat Oncol. 12(1):81-94 (2002).
Abstract of Holmes III, D et al. Proceedings of SPIE The International Society for Optical Engineering. v 4319, pp. 46-52 (2001).
Radford, D-A et al. IEEE Proceedings of the 22" Annual EMBS International Conference, Chicago IL, pp. 197-200 (Jul. 23-28, 2000).
Chu, KC et al. Magn. Reson. Med. 37(2):314-9 (1997).
Ratner, BD et al. Synthetic Hydrogels for Biomedical Applications. In Hydrogels for Medical . . . ACS Symposium Series, American Chemical Society, Washington. 31:14 (1985).
Abstract of Aung, SC et al. Ann Acad Med Singapore. (5):739-43 (1999).

* cited by examiner

Phantom, Track 2 - Force vs Depth

TISSUE-MIMICKING PHANTOM FOR PROSTATE CANCER BRACHYTHERAPY

CROSS-REFERENCE TO RELATED APPLICATIONS

This application claims the benefit of U.S. Provisional patent application Ser. No. 61/136,128 filed Aug. 13, 2008, the entire contents of which is herein incorporated by reference.

FIELD OF THE INVENTION

The present invention relates to a phantom for prostate cancer brachytherapy.

BACKGROUND OF THE INVENTION

The prostate is a gland about the size and shape of a walnut. The prostate is located between the pubic bone and rectum. It surrounds the upper part of the urethra, the tube that carries urine from the bladder. As a man ages, his prostate may change. Non-cancerous (benign) growths may form. Or some cells may change into precancerous cells and cancerous cells may form a malignant tumor. For some men, cancerous cells may form within the prostate but grow too slowly to cause problems. In other cases, cancerous tumors may grow inside the prostate, then spread.

Prostate cancer is the most frequently diagnosed cancer and the second leading cause of death due to cancer in Canadian men [1]. During the last decade, image-guided prostate brachytherapy has become a mainstream treatment option [2,3]. Brachytherapy includes a combination of fast imaging during the insertion of hollow needles (size 18 ga) to place radioactive seeds in the diseased tissue. The radioactive seeds (about 120) destroy only a small surrounding tissue envelope. The imaging techniques include transrectal ultrasound (TRUS), endorectal coil magnetic resonance imaging (MRI), and proton magnetic resonance spectroscopic imaging (MRSI), with TRUS being the current preferred option. Currently, the insertion of the needles during prostate brachytherapy is performed manually.

Two techniques currently exist for performing prostate brachytherapy: the "pre-planning technique" and the "real-time technique". In both methods a post operative CT scan is required to evaluate the post procedure results, documenting seed placement and confirming that the prescribed minimum radiation dose was achieved.

The pre-planning technique requires a detailed map of the prostate prior to surgery. Using transrectal ultrasound (TRUS), physicians complete a prostate volume determination and rendering of its spatial geometry. Based on these images, a plan for seed placement is created by the medical physicist and oncologist to achieve the desired radiation dose and dose pattern (dosimetry) to the prostate. During the implant every attempt is made to duplicate the pre-planned seed pattern in the patient. Although exact duplication is never accomplished, effective results are achieved routinely by experienced brachytherapists.

The real-time planning technique requires only a preoperative sizing of the prostate. Seeds are ordered based on prostate size and radiation strength of the seeds. The detailed mapping and planning for seed implantation (dosimetry) is calculated using a nomogram calculation or computer planning software on site at the time of implantation. The real time technique has been found to be the most accurate method of placing seeds in the prostate. This method eliminates the worry about matching a patient's position to a pre plan and permits instantaneous adjustments in the operating room when the prostate gland moves".

During prostate cancer brachytherapy about 16-30 needles are inserted in order to deliver about 60 to 120 "seeds" (small radioactive rods). The needle consists of a metal tube (18 ga or 1.25 mm diameter, 222 mm in length) with a bevelled tip and black markings at 1 cm intervals along the length. The proximal end is a plastic hub with an embossed arrow aligned with the point of the bevelled tip and a luer-lok thread. A solid rod stylette, 0.92 mm or 20 ga and length of 239 mm with black markings at 1 cm intervals, fits within the tube of the needle for the full length. The proximal end is a plastic hub. Each needle contains 1 to 6 seeds at the distal end of the tube that are usually connected by a thread. The distal end of the needle tube is plugged with wax to prevent loss of the seeds.

Brachytherapy for the treatment of prostate cancer involves the implantation of numerous radioactive seeds in a carefully pre-planned pattern in 3D within the prostate. The procedure serves to deliver a known amount of radiation dosage concentrated around the prostate, while at the same time sparing radiation-sensitive tissues such as the urethra, the bladder, and the rectum. Typically, 60 to 120 seed are placed by means of 15 to 30 needles in the inferior (feet) to superior (head) direction. These needle positions are selected from a 13×13 grid at approximately 0.5 cm evenly spaced holes in a template, which are used to achieve precise needle insertion. The numbers of these holes that intersect with the prostate cross section, and therefore are potentially usable, about 60. In current practice, the design of a suitable seed configuration which is customized to the anatomy of each patient is achieved by a specialist medical physicist or dosimetrist. The implantation is performed by an urologist or oncologist with ultrasound guidance, in consultation with a radiologist specializing in ultrasound.

The surgical team consists of two medical specialists (urologist and oncologist), an anaesthetist, a scrub nurse, an assistant nurse, a radiology technician (to operate the medical ultrasound) and a medical physicist. The order of the needle insertions and their position (coordinates on the template) is specified by the medical physicist. The scrub nurse selects the proper needle and passes to one of the specialists. This medical specialist places the needle tip into the hole of the template and pushes the needle through the skin and perineal tissue until penetrating the prostate while using the Transrectal Ultrasound (TRUS) image for guidance. Needle insertions consist of a series of pokes, sometimes accompanied by bidirectional rotation, with occasional withdrawal/retraction to reposition. The bevel of the needle tip will cause the needle to deviate from a straight trajectory which is corrected by the medical specialist. The medical specialist may use "finger direction" (the for finger presses against the needle behind the template) to modify the angle of the needle insertion. The depth and angulation of the needle tip is positioned according to a "base" defined by the distal region of the prostate as observed on the TRUS. The final position is confirmed by the other medical specialist with a ruler. The seeds are ejected from the needle by one specialist holding the stylette hub fixed while the second specialist retracts the needle barrel until the hubs contact. The needle is completely removed and placed in a waste container.

As the needle is withdrawn the seeds are deposited into the tissue. Since the needles are often deflected during insertion, 3D TRUS visualization helps to detect the deflection. Although the procedure is safe and effective it is still fraught with inadequate and inaccurate placement of the seeds. The consequences are zones of diseased tissue that are not destroyed resulting in re-growth of the cancer (requiring subsequent brachytherapy (ies)) and/or destruction of adjacent healthy cells that control the bladder sphincter muscle and/or penile erector muscles, which can result in incontinence and/or sexual dysfunction. These complications depend on the skill of the medical specialist performing the procedure.

The training of clinicians, (urologists, interventional radiologists, radiation oncologists, surgeons) would be improved by providing training simulators that mimic the morphology, mechanical properties (needle insertion) and imaging properties (ultrasound) of the tissue structures that comprise the prostate gland and adjacent tissues (skin, fascia, seminal vesicles, urethra, pelvic arch). A critical need exists is to mimic the tissues comprising the prostate by a tissue-mimicking phantom.

The use of a robot to place the seeds more accurately and quickly has been proposed. The development of this technology and the need to provide "objective evidence" that the design output meets the design parameters for regulatory submission will require stringent evaluation of this technology. There are no suitable animal models that would permit the evaluation of both the needle insertion and ultrasound guidance. A tissue-mimicking phantom would provide a simulated tissue environment for expediting the testing, refinement and validation of this technology at reduced cost.

Phantoms for medical image modalities of ultrasound, magnetic resonance imaging, computed tomography and x-ray as well as radiation therapy are reported in the literature [9-15]. All of these phantoms are intended to duplicate the image generation characteristics of tissues. The materials for these phantoms include: water, agarose gel, lipid particles, protein, glass beads, thimerosal (preservative), safflower oil, EDTA, 'bone equivalent material', evaporated milk, graphite particles, agar, animal hide protein, glycerol, polyurethane sponge, lexan, etc. Others [5,7] have prepared phantoms to address quality and consistency of Radiation Therapy Oncology for intensity modulated radiation therapy. There are published studies illustrating the effectiveness of hydrogels as tissue-mimicking phantoms [8].

A 'Tissue Equivalent Ultrasound Prostate Phantom' manufactured by CIRS [16] is commercially available. The company commented that the sole purpose of the phantom is to mimic ultrasound imaging characteristics for propagation speed and attenuation coefficient. They acknowledged that they do not know if the mechanical properties represent the mechanical forces of tissues. Since a training simulator requires a phantom with both mechanical and ultrasound imaging properties, this commercial product is not appropriate and cannot be modified to suit this application.

PVA is a polymer that can be formulated as a hydrogel with desirable properties for biomedical applications, including tissue mimicking phantoms [17,18]. In the late 1960's, PVA was cross-linked with formaldehyde to create a highly porous sponge that was marketed as Ivalon™ [12]. It was used extensively in duct replacement, articular cartilage replacement [19], as pharmaceutical release agent [12] and in reconstructive (vocal cord) surgery [20]. Although PVA can be cross-linked using glutaraldehyde, PVA has unique properties that allow it to be cross-linked by freezing and thawing (termed polyvinyl alcohol cryogel or PVA-C). The ability to modify the mechanical properties of PVA gels by physical methods (e.g. freezing/vacuum cycles) has been investigated by several authors over the past 20 years [15,21,22]. Reliable techniques for modifying the mechanical properties of PVA-C have been demonstrated [23,24]. However, some authors have indicated that PVA is not stable enough and too stiff to be suitable for application to phantoms [41].

There remains a need for a phantom for prostate cancer brachytherapy that suitably mimics the imaging and mechanical properties of a real prostate gland and its surrounding environment.

SUMMARY OF THE INVENTION

A tissue-mimicking phantom for prostate cancer brachytherapy of the present invention mimics the complex 3D morphology of the prostate gland as well as the imaging and physical properties of soft tissue structures (e.g. prostate tissue, perineal tissue, skin tissue). The tissue-mimicking phantom of the present invention advantageously mimics not only the imaging properties of the prostate and surrounding tissues, but also their mechanical properties, thereby providing a realistic phantom for prostate cancer brachytherapy. The tissue-mimicking phantom of the present invention is especially useful for mimicking human prostate glands and surrounding tissues.

Thus, there is provided a phantom for prostate cancer brachytherapy comprising: a prostate tissue phantom having a shape of a real prostate gland, the prostate tissue phantom comprising a polyvinyl alcohol cryogel having undergone 3-5 freeze-thaw cycles and having 10-20% w/w polyvinyl alcohol in a solvent, 4-8% w/w oil and an amount of acoustic scattering particles to ultrasonically distinguish the prostate tissue phantom from its surroundings; a perineal tissue phantom surrounding the prostate tissue phantom, the perineal tissue phantom comprising a polyvinyl alcohol cryogel having undergone 1-2 freeze-thaw cycles and having 10-20% w/w polyvinyl alcohol in a solvent, 4-8% w/w oil and an amount of acoustic scattering particles to ultrasonically distinguish the perineal tissue phantom its surroundings; a skin tissue phantom separating all or part of the perineal tissue phantom from an outside environment, the skin tissue phantom comprising a polyvinyl alcohol cryogel having undergone at least 6 freeze-thaw cycles and having 15-25% w/w polyvinyl alcohol in a solvent; and, an enclosure for containing the prostate tissue phantom, the perineal tissue phantom and the skin tissue phantom.

There is further provided a method of producing a phantom for prostate cancer brachytherapy comprising: providing an enclosure; positioning a polyvinyl alcohol cryogel-based skin tissue phantom in the enclosure over an area through which a brachytherapy needle can be inserted; positioning a polyvinyl alcohol cryogel-based prostate tissue phantom in the enclosure in correct anatomical orientation to the skin tissue phantom and a transrectal ultrasound for a brachytherapy procedure; introducing a polyvinyl alcohol solution into the enclosure to surround the prostate tissue phantom; and, subjecting the enclosure and its contents to at least one freeze-thaw cycle to create a polyvinyl alcohol cryogel-based perineal phantom from the polyvinyl alcohol solution.

Individual tissue phantoms within the phantom for prostate cancer brachytherapy may comprise polyvinyl alcohol cryogel (PVA-C). Polyvinyl alcohol cryogels are polyvinyl alcohol (PVA) gels in which the cross-linking is effected by subjecting the PVA to at least one freeze-thaw cycle. Polyvinyl alcohol cryogels comprise solutions of polyvinyl alcohol in a solvent. The solvent preferably comprises water or dimethyl sulfoxide (DMSO), more preferably water. The solvent is preferably purified (e.g. distilled or deionized). Polyvinyl alcohol cryogels become stiffer with an increase in the number of freeze-thaw cycles. By judiciously choosing the number of freeze-thaw cycles, the PVA content and the amount and types of additives for each tissue phantom, it has now been surprisingly found that the imaging and mechanical properties of various individual tissues may be closely mimicked, and that the individual tissue phantoms may be assembled into a phantom for prostate cancer brachytherapy that closely mimics the imaging and mechanical properties of the prostate gland and surrounding tissue environment. Particularly surprising is that the individual tissue phantoms very closely mimic needle penetration forces of real tissues. Although there is some individual subject variation, maximum needle penetration force through real tissues is generally about 1.2-5.5 N through skin, about 2.2-5.0 N through the prostate, and about 1.0-1.6 N initially through the perineum followed by a gradual increase to about 2.3-3.5 N through the perineum.

The prostate tissue phantom has a shape that matches anatomical shape of a typical prostate gland. The size of the prostate tissue phantom is preferably in a range of from about 30 ml to about 50 ml, for example about 40 ml. The prostate tissue phantom comprises a PVA-C having 10-20% w/w polyvinyl alcohol, preferably about 15% w/w, based on weight of the polyvinyl alcohol (PVA) solution. The number of freeze-thaw cycles that the prostate tissue phantom has undergone is 3 to 5, preferably 4. The PVA-C of the prostate tissue phantom also comprises 6-8% w/w oil, preferably 6% w/w, based on weight of the PVA solution. The oil preferably comprises castor oil or mineral oil. The PVA-C of the prostate tissue phantom comprises an amount of acoustic scattering particles to ultrasonically distinguish the prostate tissue phantom from its surroundings. This amount is preferably 0.1-1% w/w, more preferably about 0.5% w/w. Acoustic scattering particles preferably comprise cellulose particles. Such a prostate tissue phantom mimics the ultrasound imaging properties (e.g. echogenicity, speed of propagation and/or attenuation) of a typical prostate gland. It has a stiffness suitable for needle penetration forces through the prostate gland for mimicking needle insertion during prostate cancer brachytherapy procedures.

The perineal tissue phantom mimics the perineum surrounding the prostate gland. The perineal tissue phantom fills the space around the prostate tissue phantom and the inside of the enclosure. The perineal tissue phantom comprises a PVA-C having 10-20% w/w polyvinyl alcohol, preferably about 15% w/w, based on weight of the polyvinyl alcohol (PVA) solution. The number of freeze-thaw cycles that the perineal tissue phantom has undergone is 1 to 2, preferably 1. The PVA-C of the perineal tissue phantom also comprises 6-8% w/w oil, preferably 6% w/w, based on weight of the PVA solution. The oil preferably comprises castor oil or mineral oil. The PVA-C of the perineal tissue phantom comprises an amount of acoustic scattering particles to ultrasonically distinguish the perineal tissue phantom from its surroundings. This amount is preferably 2-10% w/w, more preferably about 3% w/w. Acoustic scattering particles preferably comprise cellulosic particles. Such a perineal tissue phantom mimics the ultrasound imaging properties (e.g. echogenicity, speed of propagation and/or attenuation) of typical perineal tissue. It has a stiffness suitable for needle penetration forces through the perineum for mimicking needle insertion during prostate cancer brachytherapy procedures. The perineal tissue phantom also preferably has an opening (e.g. a simulated lower intestine) for insertion of a transrectal ultrasound (TRUS) probe. The perineal tissue phantom permits deflection of the skin tissue phantom when the skin tissue phantom is pierced by a needle, and permits movement (translation, rotation) of the embedded prostate tissue phantom when the prostate tissue phantom is pierced by a needle, which simulates the displacement of the prostate gland during prostate cancer brachytherapy procedures. Thus, the prostate tissue phantom "floats" in the perineal tissue phantom.

The skin tissue phantom mimics natural skin. The skin tissue phantom separates all or part of the perineal tissue phantom from an outside environment. Thus, the skin tissue phantom may be a window in the enclosure, and should be of sufficient size to permit insertion of a needle for brachytherapy. The skin tissue phantom is preferably 2-5 mm thick, more preferably 3-4 mm thick, for example 3.5 mm thick. The skin tissue phantom comprises a PVA-C having 15-25% w/w polyvinyl alcohol, preferably about 20% w/w, based on weight of the polyvinyl alcohol (PVA) solution. The number of freeze-thaw cycles that the skin tissue phantom has undergone is at least 6. After six freeze-thaw cycles, the mechanical properties of the cryogel change little. Such a skin tissue phantom has a stiffness suitable for needle penetration forces through the skin for mimicking needle insertion during prostate cancer brachytherapy procedures.

A urethra tissue phantom may be embedded in the prostate tissue phantom. The urethra tissue phantom has a shape that matches the anatomical shape of a typical urethra, and is in an anatomically correct position with respect to the prostate tissue phantom. The diameter of the urethra tissue phantom may be enlarged to represent insertion of a catheter during the brachytherapy procedure. The urethra tissue phantom may comprise any suitable material, for example, an elastomer, a plastic or a polyvinyl alcohol cryogel. The urethra tissue phantom preferably comprises a PVA-C having 10-20% w/w polyvinyl alcohol in a solvent, preferably about 15% w/w, based on weight of the polyvinyl alcohol (PVA) solution. The number of freeze-thaw cycles that the urethra tissue phantom has undergone is preferably at least 5, more preferably at least 6. After six freeze-thaw cycles, the mechanical properties of the cryogel change little. The PVA-C of the urethra tissue phantom may also comprise an amount of acoustic scattering particles to distinguish it ultrasonically from its surrounding environment. This amount is preferably 5-20% w/w, more preferably about 9% w/w. Acoustic scattering particles preferably comprise cellulosic particles. Such a urethra tissue phantom mimics the ultrasound imaging properties (e.g. echogenicity, ultrasound coupling) of a typical urethra. The urethra tissue phantom may be solid or a hollow tube. If the urethra tissue phantom is a hollow tube, it may be connected to the outside environment so that a medical specialist can practice scoping the urethra for brachytherapy seeds that may have been implanted in the urethra.

One or more of the individual tissue phantoms may further comprise one or more additives to the PVA-C. Some examples of additives include biocides (e.g. diazolidinyl urea, iodopropynyl butylcarbamate, chitosan, n-propanol, p-methyl benzoic acid, 2-methoxyphenol benzoate, benzoic acid, thimerosal, formaldehyde, CIS preservative (Dow Chemical Co.) and mixtures thereof). Germall™ Plus, a mixture of diazolidinyl urea and iodopropynyl butylcarbamate (ISP Sutton Laboratories), is a particularly preferred biocide. The amount of additive depends on the pa rticular additive and individual tissue phantom.

Polyvinyl alcohols (PVAs) suitable to make PVA cryogels are well known in the art. One example of a suitable PVA is a 98-99% hydrolyzed PVA powder having an average molecular weight (Mw) of 146,000-186,000. The PVA may be dissolved in a solvent and then subjected to one or more freeze-thaw cycles to form the cryogel. In one embodiment, the PVA-C may be formed into a mesh with pores to allow the flow of a fluid through the pores. Insertion of a brachytherapy needle would pierce such a fluid-filled mesh of PVA-C. After withdrawal of the needle, the fluid would flow/fill into the needle track, thus reducing/eliminating the visible line observed by ultrasound imaging which is observed for non-porous solid PVA-C. Such meshes may be formed by extrusion in which a thin tube is used as an extrusion die in order to form a continuous fine fibre that is stacked to form a mesh of PVA, essentially creating a fluid-saturated, open-celled sponge, which can then be subjected to freeze-thaw cycles to form the cryogel. Such meshes may also be formed by electrospinning in which a PVA gel is loaded into a syringe and this liquid is driven to the needle tip by a syringe pump, forming a droplet at the tip. When a voltage is applied to the needle, the droplet is first stretched into a structure called a Taylor cone. The jet is then elongated and whipped continuously by electrostatic repulsion until it is deposited on the grounded collector. This process can produce continuous, fine fibres that can be deposited in layers with controlled spacing inside a mould or by freedom shaping to build a mesh with desired thickness and shape.

The enclosure contains all of the other components of the phantom for prostate cancer brachytherapy procedures including needle insertions both with and without finger direction. The enclosure may be, for example, a simple box having four walls, a base and a top surrounding a cavity. Alternatively, the shape can represent the rectal region of a male. Another approach for the enclosure is to apply a waterproof/air-proof coating to the perineal and skin tissue phantoms. These coatings may be deposited plastics or elastomers.

The enclosure may be constructed of any suitable material, however, the enclosure is preferably constructed with one or more of the following characteristics. It preferably is able to withstand freeze-thaw cycles in which the PVA-C expands. It preferably has an opening, which will be filled by the skin tissue phantom, to permit insertion of brachytherapy needles. It preferably has an opening and a cavity to simulate a rectum and lower intestine to permit insertion of a transrectal ultrasound (TRUS) probe. The simulated rectum and lower intestine may comprise, for example, an insert (preferably cylindrical) extending into the enclosure to provide the opening and cavity in the perineal tissue phantom for insertion of the TRUS probe. The enclosure is preferably air-tight to reduce drying of the PVA-C. It preferably has an enlarged base for stability and to facilitate immobilizing it to a surface. The enclosure preferably has a mounting fixture to support a template against a face of the enclosure or with a separation to allow the forefinger to be inserted behind the template ("finger direction") for locating brachytherapy needles in accordance with a simulated plan for seed placement. At least one wall and the insert of the enclosure is preferably removable. Preferably it can be partially disassembled to permit pouring of PVA solution to form the perineal tissue phantom and to permit replacement of the complete phantom. It preferably has small holes to accommodate fine wires for positioning of the prostate tissue phantom and skin tissue phantom during assembly. It is preferably made from a material that reduces abnormal ultrasound reflections and is transparent to permit positioning of the prostate tissue phantom. The enclosure is preferably constructed from clear plastic materials (e.g. polycarbonate, polyester, epoxy) or from elastomers (e.g. rubber, urethane, silicone).

Individual tissue phantoms, especially the prostate, skin and urethra tissue phantoms, may be made from PVA-C with help of moulds. Generally, PVA solution may be poured or otherwise introduced into a mould of proper size and shape, and then the mould, together with the PVA solution, subjected to freeze thaw cycles to form the PVA-C tissue phantom. The proper size and shape of the mould may determined, for example, by using ultrasound diagnostic imaging to define tissue morphology by 3D reconstruction of ultrasound images, and then constructing the mould using a rapid prototyping technique, for example selective laser sintering (SLS) [25-27], stereolithography (SLA) or fused deposition modelling (FDM). The perineal tissue phantom may be created by simply filling the enclosure with an appropriately constituted aqueous PVA solution and then doing a freeze-thaw cycle on the whole enclosure. The prostate tissue phantom may be formed separately from or together with the urethra tissue phantom. To form the prostate tissue phantom together with the urethra tissue phantom, an already moulded urethra tissue phantom is placed in the correct anatomical orientation in the prostate tissue phantom mould, an appropriately constituted aqueous PVA solution for the prostate tissue phantom is introduced into the prostate mould, and freeze-thaw cycles are performed on the prostate mould having the urethra tissue phantom therein.

The phantom for prostate cancer brachytherapy of the present invention and the individual tissue phantoms are useful for one or more of the following: for performance checks of transducers and ultrasound imaging systems; as anthropometric training phantoms (student ultrasound imaging technologists, medical specialists); to develop in vivo techniques for ultrasound tissue image characterization; for quality control (clinical procedures, manufacturing); to accelerate the development of new medical device technologies; to provide "objective evidence" of effectiveness, safety, efficacy (regulatory compliance); to reduce/avoid reliance on animal testing; for testing of technologies on human substitute tissues when an ethical dilemma exists.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Example 1

Preparation of Polyvinyl Alcohol Cryogels

Figure 1:
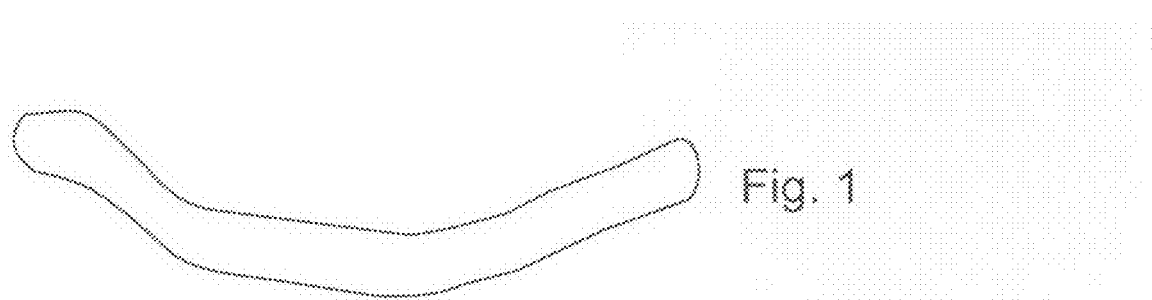
FIG. 1 depicts a schematic illustration of a urethra tissue phantom in accordance with the present invention constructed from a 3D rendering of a urethra extracted from ultrasound medical images.

Into a 1000 ml three-necked flat-bottomed flask at room temperature is charged polyvinyl alcohol (PVA) powder ($M_w$=124,000-164,000; Aldrich 36, 316-2) and distilled or deionized water in amounts as shown in Table 1 depending on the desired amount and PVA concentration. At this stage, the PVA solution is abbreviated "PVA-S".

The solution is mixed with a stirring rod and the flask is placed on a warm heating mantle. The necks of the flask are outfitted with a condenser, a thermometer and a stirrer (Heidoph type RZR.1). The solution is heated with stirring to a temperature of 80° C., being careful not to allow the temperature to exceed 95° C. (for higher proportions of PVA (>25%) the temperature is allowed to reach 80° C. before stirring is commenced). The solution is cooked at 80° C. for 1-2 hours (1 hour for 300 ml batches, 2 hours for 1000 ml batches) to produce a gooey PVA solution abbreviated as "PVA-H", which is allowed to cool. Any air bubbles may be removed by allowing the PVA-H to sit for 1-24 hours or by the application of vacuum.

For thick batches (greater than 20% w/w PVA), the PVA solution is prepared by using the correct amount of water for the desired concentration, but initially reducing the amount of PVA to the amount used for 20% w/w, heating the solution to 90° C. for 1 hour and then adding the remainder of the PVA.

TABLE 1

Amounts of PVA and Water for PVA Solutions

| PVA-S (% w/w) | PVA powder (g)/Water (ml) | | | | | |
|---|---|---|---|---|---|---|
| | 300 ml | 400 ml | 500 ml | 600 ml | 800 ml | 1000 ml |
| 5% | 15/285 | 20/380 | 25/475 | 30/570 | 40/760 | 50/950 |
| 6% | 18/282 | 24/376 | 30/470 | 36/564 | 48/752 | 60/940 |
| 8% | 24/276 | 32/368 | 40/460 | 48/552 | 64/736 | 80/920 |
| 10% | 30/270 | 40/360 | 50/450 | 60/540 | 80/720 | 100/900 |
| 12% | 36/264 | 48/352 | 60/440 | 72/528 | 96/704 | 120/880 |
| 15% | 45/255 | 60/340 | 75/425 | 90/510 | 120/680 | 150/850 |
| 20% | 60/240 | 80/320 | 100/400 | 120/480 | 160/640 | 200/800 |
| 25% | 75/225 | 100/300 | 125/375 | 150/450 | 200/600 | 250/750 |
| 30% | 90/210 | 120/280 | 150/350 | 180/420 | 240/560 | 300/700 |
| 35% | 105/195 | 140/260 | 175/325 | 210/390 | 280/520 | 350/650 |
| 40% | 120/180 | 160/240 | 200/300 | 240/360 | 320/480 | 400/600 |
| 45% | 135/165 | 180/220 | 225/275 | 270/330 | 360/440 | 450/550 |
| 50% | 150/150 | 200/200 | 250/250 | 300/300 | 400/400 | 500/500 |

Example 2

Preparation of Skin Tissue Phantom

A 3.5 mm thick PVA-C skin tissue phantom is created as follows.

A 300 ml batch of aqueous PVA-H solution comprising 20% w/w PVA is prepared in accordance with the procedure in Example 1. When the heating/stirring is finished, the temperature of the solution is allowed to drop to 70° C. A solution of 0.2% w/w Germall™ Plus (a biocide from ISP Sutton Laboratories) and approximately 2 ml distilled water is formed and gently stirred into the cooked PVA, being careful not to introduce air bubbles into the mixture. The resulting PVA solution is injected into a plate mould having dimensions suitable for the skin tissue phantom until the plate mould is full and allowed to cool for 1 hour.

Six freeze-thaw cycles are then performed on the PVA solution in the mould. The freeze-thaw cycles are performed in a heated/refrigerated circulator bath (VWR model 1187P) or an Environmental Chamber (Cincinnati Sub-Zero model ZH-8-1-H/AC). The temperature is cycled between +20° C. and −20° C. at controlled cooling and thawing rates (typically 0.1° C./min), with 1 hour hold periods at −20° C. and +20° C. A seventh freeze-thaw cycle is performed when the entire phantom for prostate cancer brachytherapy undergoes a freeze-thaw cycle as described in Example 6 below.

The PVA-C skin tissue phantom is removed from the mould and its perimeter is cut to suit the opening in the enclosure. A circular opening is also cut into the skin tissue phantom to accommodate a cylindrical insert that will act as a simulated rectum. The skin tissue phantom may be stored flat for later use in a sealed container. In another embodiment, the skin tissue phantom is cut to suit mounting within the opening for the brachytherapy needles and a template is mounted away from the face of the enclosure so that the medical specialist can practice "finger direction".

Example 3

Preparation of Urethra Tissue Phantom

An anatomically shaped PVA-C urethra tissue phantom is created as follows.

A mould in the shape of a urethra having the proper size and shape is created by using ultrasound diagnostic imaging to define tissue morphology by 3D reconstruction of ultrasound images. The mould is then constructed using fused deposition modelling (FDM).

A 300 ml batch of aqueous PVA-H solution comprising 15% w/w PVA is prepared in accordance with the procedure in Example 1. When the heating/stirring is finished, the temperature of the solution is allowed to drop to less than 55° C. A 20 ml aliquot of the PVA-H is placed in a beaker and 9% w/w (1.8 g) Sigmacell™ Type 50 (cellulose particles from Sigma-Aldrich) is gently stirred into the 20 ml aliquot of cooked PVA in the beaker, being careful not to introduce air bubbles into the mixture. The resulting PVA solution from the beaker is injected into the urethra-shaped mould until the mould is full and allowed to cool for 1 hour.

Three freeze-thaw cycles are then performed on the PVA solution in the mould. The freeze-thaw cycles are performed in a heated/refrigerated circulator bath (VWR model 1187P) or an Environmental Chamber (Cincinnati Sub-Zero model ZH-8-1-H/AC). The temperature is cycled between +20° C. and −20° C. at controlled cooling and thawing rates (typically 0.1° C./min), with 1 hour hold periods at −20° C. and +20° C. Three more freeze-thaw cycles are performed when the urethra tissue phantom is combined with the prostate tissue phantom as described in Example 4 below. A seventh freeze-thaw cycle is performed when the entire phantom for prostate cancer brachytherapy undergoes a freeze-thaw cycle as described in Example 6 below.

The PVA-C urethra tissue phantom is removed from the mould and may be stored under refrigeration in a sealed container for later use. FIG. 1 depicts the PVA-C urethra tissue phantom.

Example 4

Preparation of Prostate Tissue Phantom with Urethra Tissue Phantom Therein

An anatomically shaped 40 ml PVA-C prostate tissue phantom together with a urethra tissue phantom is created as follows.

Figure 2A:
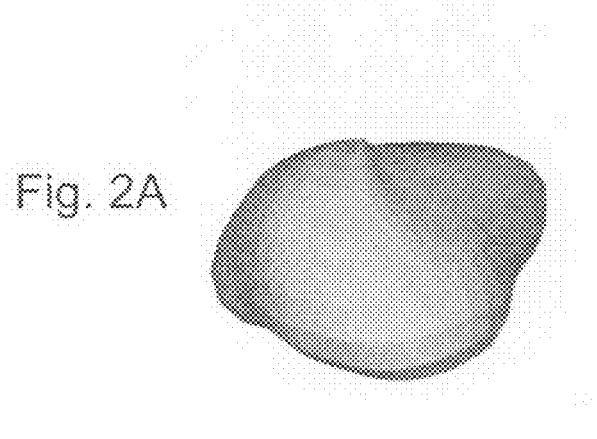
FIG. 2A depicts a schematic illustration of a 3D rendering of a prostate gland extracted from ultrasound medical images.

A mould in the shape of a prostate gland having the proper size and shape is created by using ultrasound diagnostic imaging to define tissue morphology by 3D reconstruction of ultrasound images. FIG. 2A depicts a schematic illustration of the 3D rendering of a prostate gland extracted from the ultrasound medical images. The mould is then constructed using fused deposition modelling (FDM). The mould is also made with cavities to accept the ends of the urethra tissue phantom.

Figure 2B:
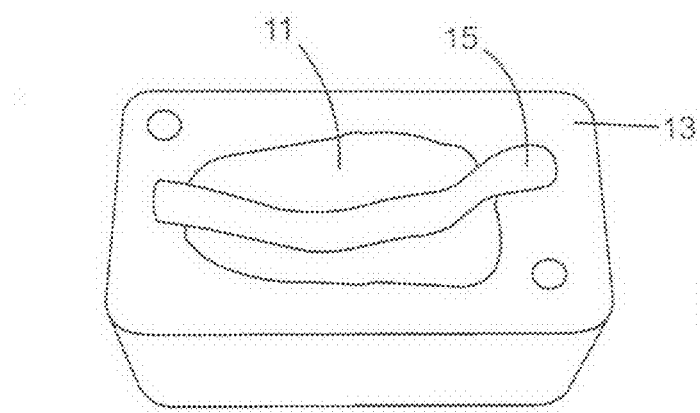
FIG. 2B depicts a bottom half of a prostate tissue phantom mould filled with PVA solution and having the urethra tissue phantom of FIG. 1 inserted therein.

A 300 ml batch of aqueous PVA-H solution comprising 15% w/w PVA is prepared in accordance with the procedure in Example 1. When the heating/stirring is finished, the temperature of the solution is allowed to drop to 70° C. A slurry of 0.5% w/w Sigmacell™ Type 50 (cellulose particles from Sigma-Aldrich) and a small amount of distilled water is formed and gently stirred into the cooked PVA, being careful not to introduce air bubbles into the mixture. Castor oil (6% w/w) is then added to the solution with vigorous stirring. Referring to FIG. 2B, the resulting PVA solution 11 is injected into bottom 13 of the prostate mould, and urethra tissue phantom 15 of Example 3 is placed across the PVA-H solution in the bottom of the mould with the ends of the urethra tissue phantom in the cavities such that the urethra tissue phantom is in the anatomically correct position. The top of the mould is then secured to the bottom of the mould, the mould filled by injecting more of the PVA solution, and allowed to cool for at least 2 hours.

Figure 2C:
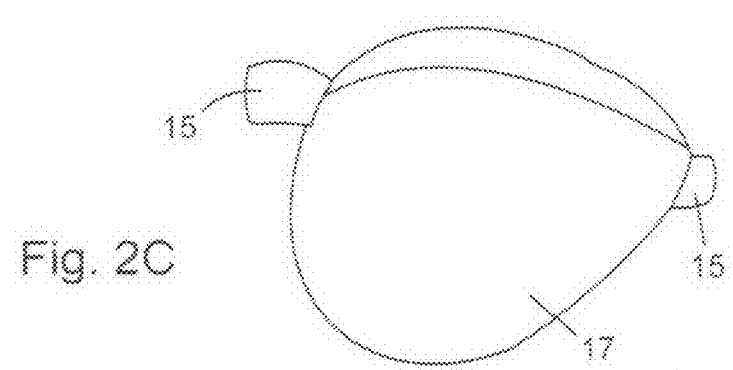
FIG. 2C depicts a schematic illustration of a prostate tissue phantom associated with a urethra tissue phantom in anatomically correct position in accordance with the present invention.
Figure 3A:
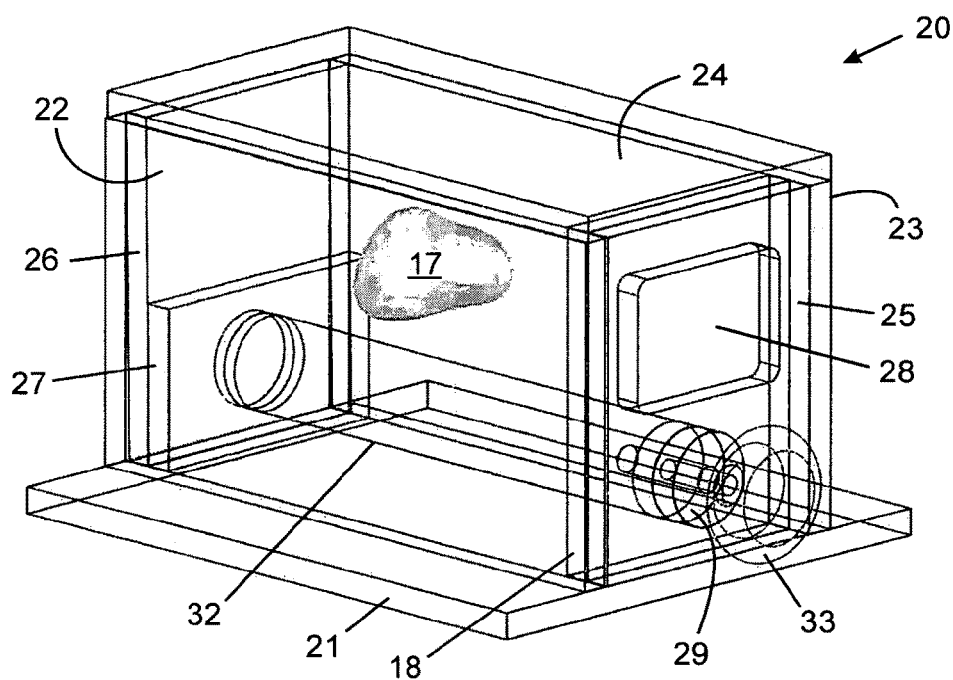
FIG. 3A depicts a schematic illustration of a transparent isometric view of a phantom for prostate cancer brachytherapy in accordance with the present invention without a cover.
Figure 3B:
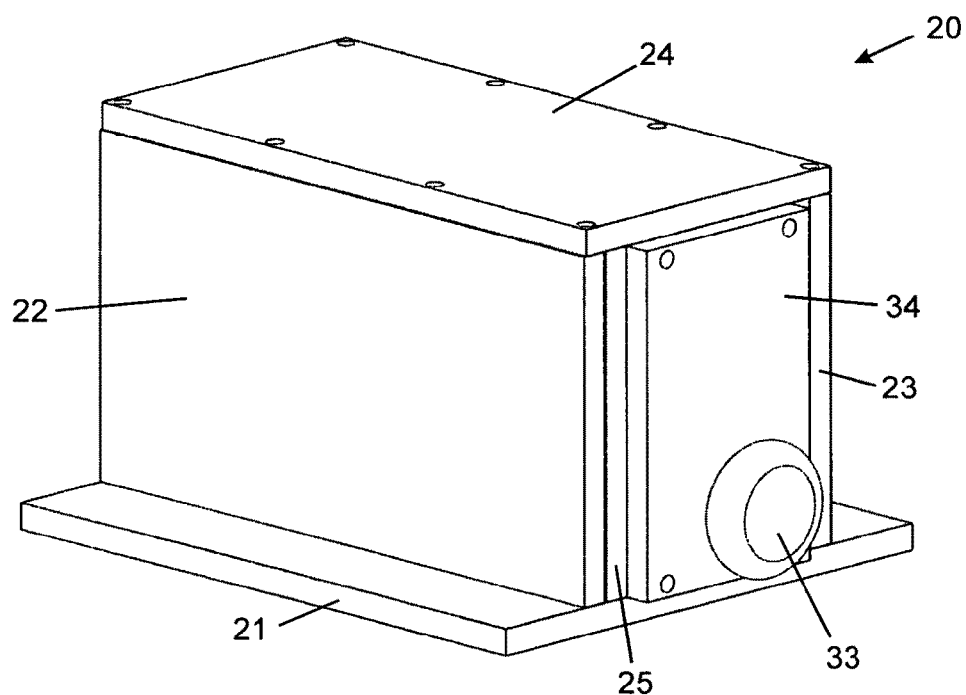
FIG. 3B depicts a schematic illustration of a solid isometric view of the phantom of FIG. 3A with a cover.
Figure 3C:
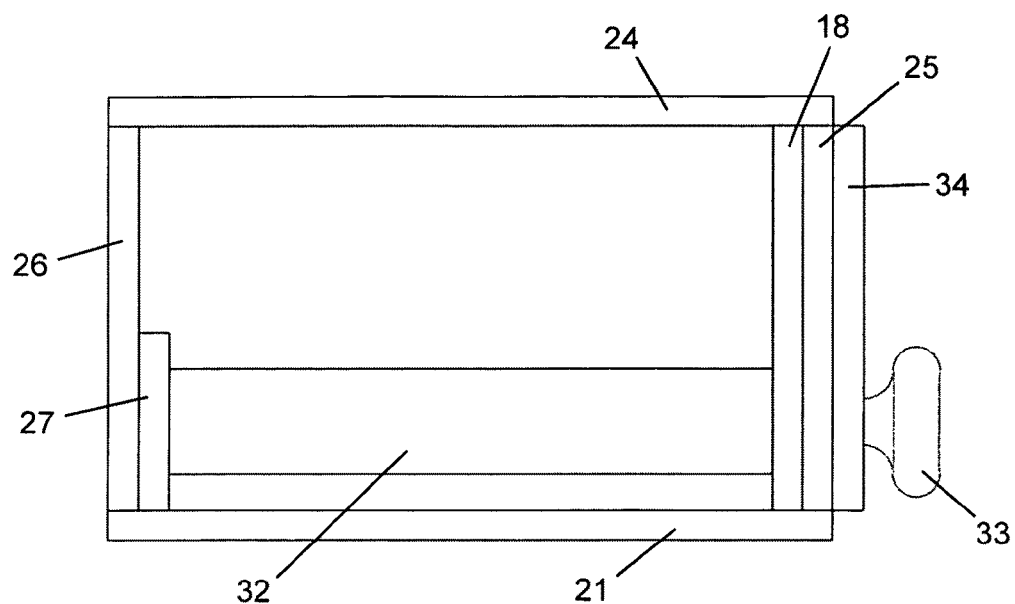
FIG. 3C depicts a schematic illustration of a side face of the phantom of FIG. 3A with the side removed.
Figure 3D:
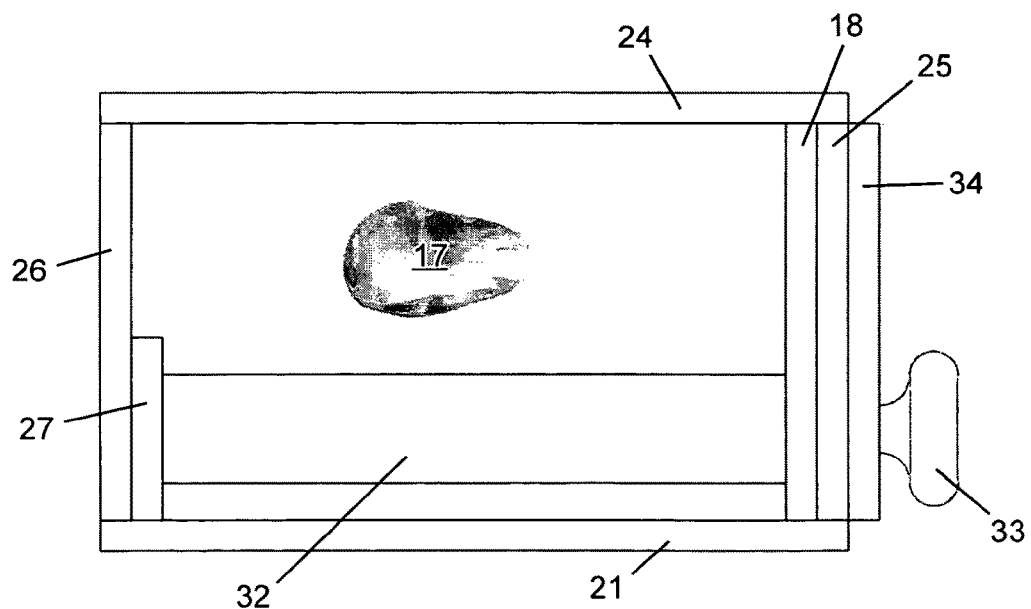
FIG. 3D depicts a schematic illustration of a longitudinal cross-section of the phantom of FIG. 3A.
Figure 3E:
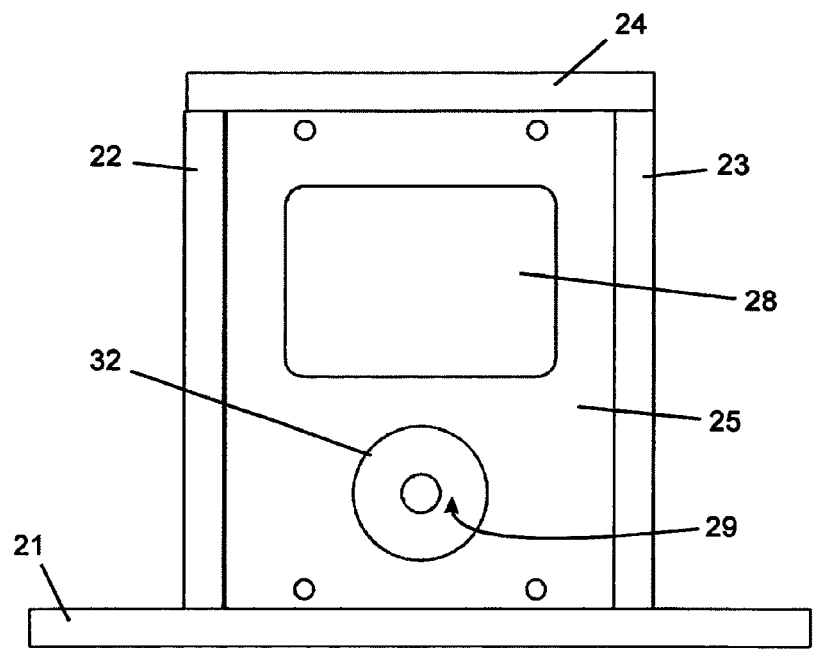
FIG. 3E depicts a schematic illustration of a front face of the phantom of FIG. 3A without a cover.
Figure 3F:
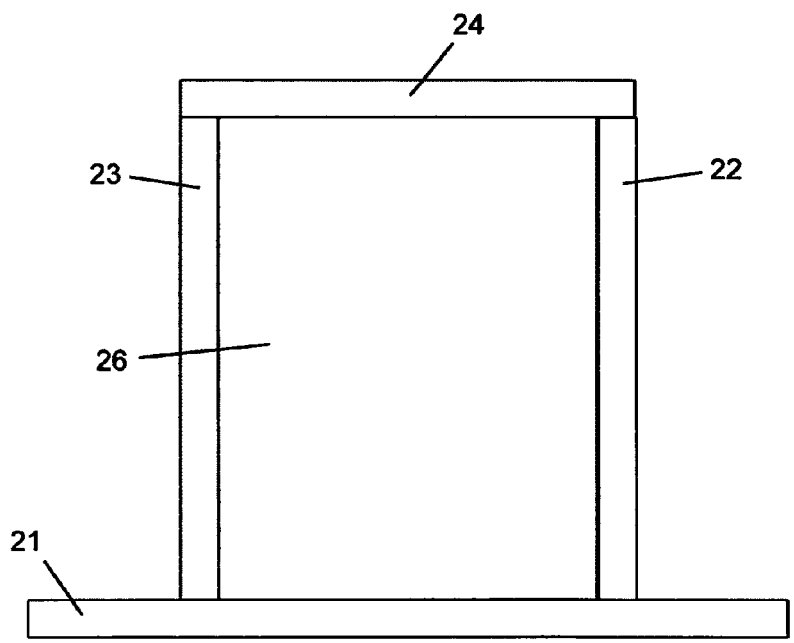
FIG. 3F depicts a schematic illustration of a back face of the phantom of FIG. 3A.

Three freeze-thaw cycles are then performed on the PVA solution together with the urethra tissue phantom in the mould. The freeze-thaw cycles are performed in a heated/refrigerated circulator bath (VWR model 1187P) or an Environmental Chamber (Cincinnati Sub-Zero model ZH-8-1-H/AC). The temperature is cycled between +20° C. and −20° C. at controlled cooling and thawing rates (typically 0.1° C./min), with 1 hour hold periods at −20° C. and +20° C. Referring to FIG. 2C, the result is a PVA-C prostate tissue phantom 17 associated with the PVA-C urethra tissue phantom 15 in an anatomically correct position. A fourth freeze-thaw cycle on the prostate tissue phantom and a seventh freeze-thaw cycle on the urethra tissue phantom is performed when the entire phantom for prostate cancer brachytherapy undergoes a freeze-thaw cycle as described in Example 6 below.

The PVA-C prostate tissue phantom with the PVA-C urethra tissue phantom is removed from the mould and may be stored under refrigeration in a sealed container for later use.

Example 5

Preparation of Perineal Tissue Phantom

To prepare the perineal tissue phantom, an 800 ml batch of aqueous PVA-H solution comprising 15% w/w PVA is prepared in accordance with the procedure in Example 1. When the heating/stirring is finished, the temperature of the solution is allowed to drop to 70° C. A slurry of 3% w/w Sigmacell™ Type 50 (cellulose particles from Sigma-Aldrich), 0.2% w/w Germall Plus (a biocide from ISP Sutton Laboratories) and a small amount of distilled water is formed and gently stirred into the cooked PVA, being careful not to introduce air bubbles into the mixture. Castor oil (6% w/w) is then added to the solution with vigorous stirring. The resulting PVA solution is cooled to less than 55° C. and poured while still warm into the enclosure as described in Example 6. As described in Example 6, the PVA-C perineal tissue phantom is created with one freeze-thaw cycle.

Example 6

Assembling a Phantom for Prostate Brachytherapy

Referring to FIGS. 3A-3F, assembly of a phantom for prostate brachytherapy is now described.

Box-like phantom enclosure 20 comprises base 21, sides 22,23, removable lid 24, removable front plate 25, and removable back plate 26. The base, sides, lid, front plate and back plate are made of transparent polycarbonate. Front plate 25 comprises rectangular window 28 and cylindrical opening 29, the front plate being securable to the sides, base and lid by screws. Rectangular window 28 provides an opening through which a brachytherapy needle may be inserted through the skin tissue phantom. Cylindrical opening 29 provides a simulated rectum through which a TRUS probe may be inserted into a cylindrical cavity which provides a simulated lower intestine. Rod 32 may be inserted through cylindrical opening 29 into the cylindrical cavity when the fully assembled phantom is not in use to reduce drying out of the perineal tissue phantom. Rod 32 is also used to define the cylindrical cavity while pouring the perineal tissue phantom during initial assembly of the phantom. Cover 34, made of transparent polycarbonate and used during storage of the fully assembled phantom, may be secured to front plate 25 by screws. Rod 32 is equipped with removable knob 33 for securing the rod to cover 34 for ease of insertion and withdrawal of the rod from the fully assembled phantom. Back plate 26 is securable to the base and lid by screws. Sitting on the base at the bottom of the enclosure and in front of back plate 26 is block 27 having a cylindrical cut-out for accommodating rod 32 and the cylindrical cavity. Lid 24 is securable to the top edges of the sides, back plate and front plate by means of screws. Two small holes in the base and two small holes in the lid are provided for accommodating two wires for use in positioning prostate tissue phantom 17 in the enclosure.

In some embodiments, gaskets may be used to provide air-tight seals at interfaces between the sides, front plate, back plate and lid. Further, a fixture for a seed placement template may be attached to front plate 25 using holes in the front plate to which cover 34 is normally screwed during storage. A spacer may be inserted between the template and the front plate to maintain a gap between the two.

To initially assemble the various components into a fully assembled phantom, lid 24, front plate 25 and back plate 26 of enclosure 20 are initially separated from the empty enclosure. Rod 32 is inserted into cylindrical opening 29 of front plate 25 and partially into the empty enclosure. Skin tissue phantom 18 from Example 2 is positioned so that rod 32 passes through the circular opening and the skin tissue phantom rests against the inside of front plate 25. Rod 32 is then fully inserted into the enclosure so that the end of rod 32 rests in the cylindrical cut-out in block 27. A removable window insert may be placed in rectangular window 28 to prevent bulging of skin tissue phantom 18 after the perineal tissue phantom is poured into the enclosure. Alternatively, the skin tissue phantom may be cut to fit within the rectangular window, positioned within the window and fine wires inserted through small holes in the sides at the front to prevent the skin tissue phantom form moving/floating during pouring of the PVA solution for the perineal tissue phantom. In this case, the window insert would be omitted. The front plate is then secured with screws.

To ensure that skin tissue 18 phantom adheres to front plate 25, the skin tissue phantom is lifted from the front plate and a small amount of PVA or silicone is spread over the inside surface of the front plate using a small stir-rod and the skin tissue phantom is pressed back down onto the front plate to ensure good contact and smoothed to remove air bubbles. If necessary, the skin tissue phantom can be carefully lifted and a thin wire used to remove any larger air bubbles that may have formed.

To position prostate tissue phantom 17 (prepared in accordance with Example 4 including the urethra tissue phantom) in enclosure 20, two small calibre wires are partially inserted into capillary tubes. Using the capillary tubes as needles, the wires are inserted through the bottom side of the prostate tissue phantom, one on either side, approximately 5 mm in from the widest portions, and the capillary tubes are removed. The ends of the wires are inserted into the small holes in base 21 (note: smaller end of prostate tissue phantom is oriented towards the front), lid 22 is positioned on the enclosure, and the two wires are passed through the holes in the lid. The lid is secured with screws. The wires are pulled snug from both ends, thereby positioning the prostate tissue phantom. The ends of the wires are bent over and taped to the top and bottom of the enclosure to maintain the position of the prostate tissue phantom.

The enclosure is then positioned on its front face by placing it on an open container of just the right size to support the corners of the enclosure. Warm PVA solution (less than 55° C.) prepared in accordance with Example 5 is then poured through the open back face of the enclosure until the level is approximately 5 mm below the opening. If the enclosure were to be in its normal orientation, and the pouring performed through the top, the prostate tissue phantom could undesirably slide down the wires. If the warm PVA solution has a temperature greater than 55° C., the prostate, urethra and skin tissue phantoms might melt. Back plate 26 is then replaced and secured with screws. The enclosure is returned to its upright orientation to allow the surrounding warm PVA to reposition itself. The wires securing the prostate tissue phantom are not removed. The warm PVA solution is allowed to cool for at least 2 hours.

One freeze-thaw cycle is then performed to create PVA-C perineal tissue phantom in the enclosure surrounding prostate tissue phantom 17. The freeze-thaw cycle is performed in a heated/refrigerated circulator bath (VWR model 1187P) or an Environmental Chamber (Cincinnati Sub-Zero model ZH-8-1-H/AC). The temperature is cycled between +20° C. and −20° C. at controlled cooling and thawing rates (typically 0.1° C./min), with 1 hour hold periods at −20° C. and +20° C. After the freeze-thaw cycle, the two wires positioning the prostate tissue phantom are removed. Cover 34 and knob 33 are secured to front plate 25 and rod 32, respectively, for storage. The cover together with the rod are removed when the phantom is in use leaving a cylindrical cavity in the perineal tissue phantom for insertion of the TRUS ultrasound.

In the phantom for prostate cancer brachytherapy, the skin and urethra tissue phantoms undergo seven freeze-thaw cycles in total, the prostate tissue phantom undergoes four freeze-thaw cycles in total, and the perineal tissue phantom undergoes one freeze-thaw cycle in total.

Example 7

Needle Penetration Properties

A phantom for prostate cancer brachytherapy constructed in accordance with the examples above has mechanical properties that are suitably within the range of real-life biological variation for the prostate gland and surrounding tissues. The most important mechanical property from the standpoint of brachytherapy phantoms is the resistance of the tissue phantom to needle penetration. Analysis of the needle penetration forces for various tissues in real-life prostate cancer brachytherapy operations provides a range of forces and an average peak force for each tissue type as shown in Table 2. Comparison of these forces to needle penetration forces obtained for various PVA-C formulations shows that the formulations for each of the tissue phantoms of the present invention falls within the real-life biological variation. Needle penetration forces may be measured using any suitable apparatus and method known in the art. A particularly suitable apparatus is described in Example 9 below.

For the real tissue samples, the needle penetration forces in Table 2 are the average maximum force±standard deviation. The range of average maximum needle penetration forces over five patients is provided in parentheses. The average maximum needle penetration force for each patient was calculated from multiple needle insertions. For each of the PVA-C samples, the needle penetration forces in Table 2 are the average maximum force taken from three needle insertions. The number in front of the "C" refers to the number of freeze-thaw cycles, e.g. 15% PVA-1C is a 15% w/w PVA cryogel having undergone one freeze-thaw cycle as described previously.

Based on Table 2, it is apparent that the PVA-C formulations described for the tissue phantoms in the examples above fall within the biological range for each of the real tissue types. Thus, the prostate tissue phantom having undergone four freeze-thaw cycles (4C) and comprising 15% w/w PVA, 9% w/w Sigmacell, 6% w/w castor oil and 0.2% w/w Germall Plus would have a maximum needle penetration force at about 4.5 N, a value close to the middle between 3.0 N and 5.6 N. The perineal tissue phantom having undergone one freeze-thaw cycle (1C) and comprising 15% w/w PVA, 3% w/w Sigmacell, 6% w/w castor oil and 0.2% w/w Germall Plus would have a maximum needle penetration force of about 3.0 N. The skin tissue phantom having undergone seven freeze-thaw cycles (7C) and comprising 20% w/w PVA and 0.2% w/w Germall Plus would have a maximum needle penetration force of about 6.3 N for a solid sample. It is further evident from Table 2 that a reduction in PVA concentration reduces needle penetration force. The addition of castor oil decreases needle penetration force for samples containing 15% w/w PVA more significantly than for samples containing 10% w/w PVA.

TABLE 2

Needle Penetration Forces for Real Tissues and Tissue Phantoms

| Sample | Needle Penetration Force (N) |
|---|---|
| Real skin tissue | 3.5 ± 1.0 (2.3-5.2) |
| Real perineal tissue | 2.6 ± 0.6 (1.6-3.3) |
| Real prostate gland | 4.2 ± 1.0 (2.8-5.0) |
| 15% PVA-1C + 0.2% Germall Plus | 4.7 |
| 15% PVA-6C + 0.2% Germall Plus | 8.4 |
| 15% PVA-1C + 2% Sigmacell + 0.2% Germall Plus | 4.9 |
| 15% PVA-6C + 2% Sigmacell + 0.2% Germall Plus | 7.7 |
| 15% PVA-1C + 6% mineral oil + 0.2% Germall Plus | 3.2 |
| 15% PVA-6C + 6% mineral oil + 0.2% Germall Plus | 6.2 |
| 15% PVA-1C + 6% castor oil + 0.2% Germall Plus | 3.0 |
| 15% PVA-6C + 6% castor oil + 0.2% Germall Plus | 5.6 |
| 10% PVA-1C + 0.2% Germall Plus | 3.7 |
| 10% PVA-6C + 0.2% Germall Plus | 5.9 |
| 10% PVA-1C + 3% Sigmacell + 6% castor oil + 0.2% Germall Plus | 3.2 |
| 10% PVA-6C + 0.5% Sigmacell + 6% castor oil + 0.2% Germall Plus | 5.4 |
| 5% PVA-1C + 0.2% Germall Plus | 0.8 |
| 5% PVA-6C + 0.2% Germall Plus | 4.2 |
| 5% PVA-1C + 3% Sigmacell + 6% castor oil + 0.2% Germall Plus | 0.9 |
| 5% PVA-6C + 0.5% Sigmacell + 6% castor oil + 0.2% Germall Plus | 2.3 |

It is interesting to note that a recent publication by Podder et al. [50] presents a table with "Max. Force in Perineum (N)" and "Max. Force in Prostate (N)". The forces reported therein are 15.03±3.26 and 7.11±1.92, respectively, and it is not clear why the forces reported by Podder et al. differ from the forces reported herein in Table 2 for real tissues.

Figure 4A:
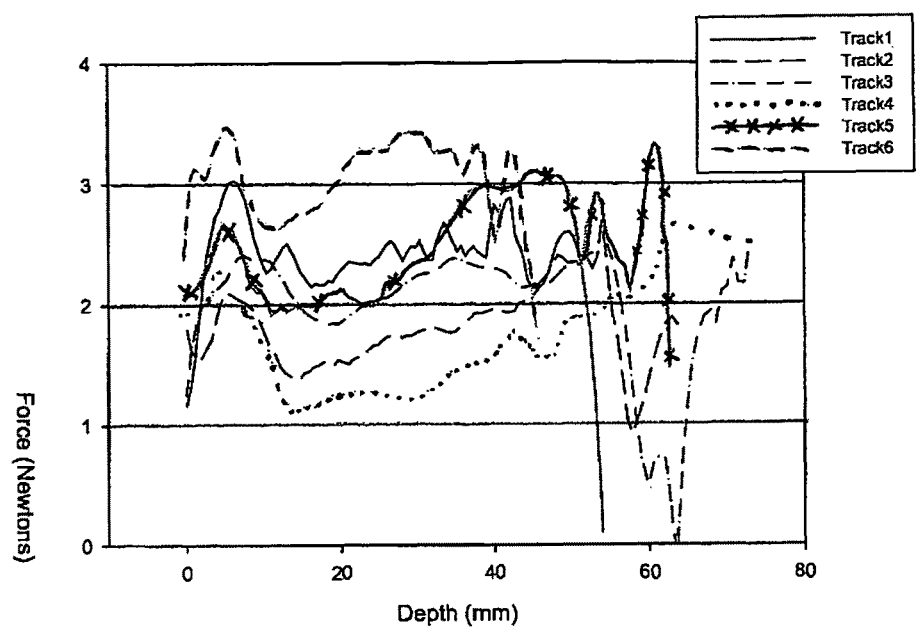
FIG. 4A depicts a graph of averaged penetration force vs. depth for 6 needle insertion tracks in a patient during a prostate cancer brachytherapy procedure.
Figure 4B:
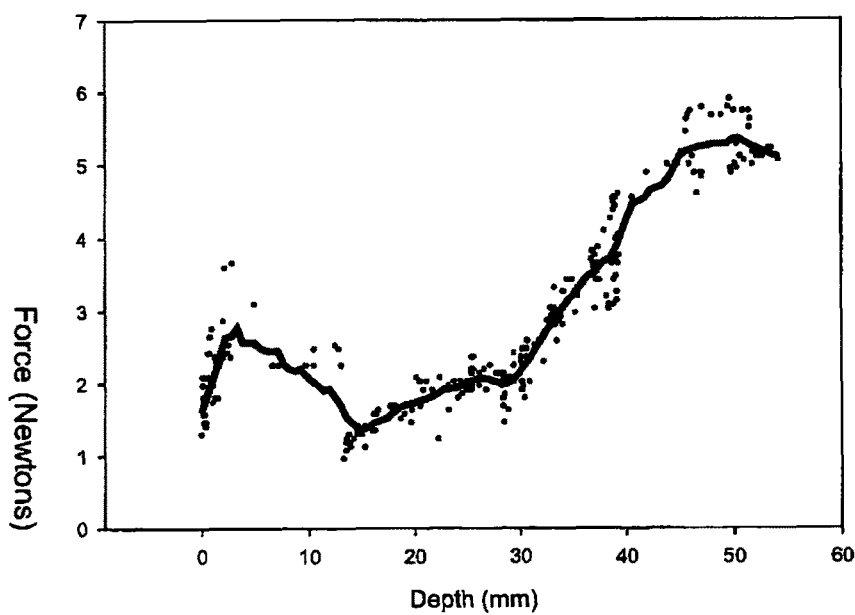
FIG. 4B depicts a graph of penetration force vs. depth for a needle insertion track in a phantom for prostate cancer brachytherapy of the present invention by the same surgeon who performed the procedure for FIG. 4A.

Referring to FIG. 4, FIG. 4A illustrates penetration forces-versus depth of 6 needle insertions for a patient undergoing prostate cancer brachytherapy (finger direction may have been used during some of the needle insertions). For comparison, FIG. 4B illustrates the penetration force versus depth of a needle insertion into the phantom for prostate cancer brachytherapy of the present invention (without finger direction) performed by the same medical specialist who performed the insertions for FIG. 4A. It is evident that penetration forces in the phantom of the present invention reasonably mimic the forces in real prostate cancer brachytherapy procedures.

Individual insertions by clinicians show a variety of force/depth profiles. During needle insertion there are a combination of affects occurring that includes cutting, sliding, coulomb friction, tissue deformation and displacement and peeling. In most cases (but not all) there is an initial peak within the first 20 mm that coincides with penetration through the skin. The force then decreases as the needle penetrates through the perineum. Penetration into the prostate is usually evident by a rise in the force but often there is little difference between the perineum and prostate forces. Others have commented that the frictional forces created on the needle by bursting strength of the skin and elasticity of the skin (porcine) resulting in subsequent frictional forces due to tissue clamping of the needle cause deviations in the force data.

Within each subject the forces for skin, perineum and prostate insertion can vary by a factor of 2. Others have observed a similar variation (90%) related to peak forces. Although it was expected that there would be an apparent force increase when the needle enters the prostate, it is often difficult to distinguish between penetration through the perineum and penetration into the prostate. Through clinical observations and the present prostate tissue-mimicking phantom studies it is known that the prostate moves (translation, rotation) when the brachytherapy needle enters which contribute to the uncertainty. In addition, only the first needle insertion would penetrate intact tissue. Subsequent withdrawals/insertions may follow a previous insertion track or penetrate intact tissue. If a subsequent insertion force is less, it can be assumed that the needle may have followed the previous insertion track. Re-positionings in the prostate were usually a deeper penetration into intact tissue but often the forces were less than the previous insertion through the prostate. This reduction may be attributable to a pause to check ultrasound images to track needle position, which resulted in relaxation of the tissue.

As mentioned previously, another factor for the variation in forces for multiple insertions along the same track, is "finger direction", where the clinician reaches behind the template to press the needle in a desired direction. In this case it would be expected that the forces during subsequent insertions would result in an increase in the force/depth plot due to the increased frictional resistance against the surgical glove. However, a study of finger direction using tissue-mimicking prostate phantoms showed no statistically significant increase for finger direction.

Only the first insertion is not affected by previous insertions and finger direction. Most clinicians make the first insertion through the skin and perineum, stopping when they penetrate the prostate.

Others have suggested that stiffness of cancerous prostate tissue increases with respect to normal prostate tissue. The fact that there is a significant difference in the forces for needle penetration into/through the prostate could be interpreted as confirmation. However, there are no comparative data for normal prostates alone. There are differences in the penetration forces among subjects. The differences, particularly "peak", suggest that the biological variation would make it very difficult to differentiate cancerous versus normal in a population, using needle penetration as an indicator of tissue stiffness.

Consistency of insertion velocity could also be a factor that affects the force of penetration. Past measurements of force versus displacement at 3 different needle velocities (50 mm/min, 100 mm/min, 150 mm/min) showed a similar force profile but lowered peak forces (about 15% for each increment of velocity) through porcine ligamentum flavum with increased velocity Sample velocities during needle penetration were computed, plotted and visually examined for selected tracks. No consistent trends between needle force and velocity were evident.

Example 8

Ultrasound Imaging Properties

Ultrasonic sound waves are at frequencies above the audible range (20 kHz). Although ultrasound exhibits the same physical properties as audible sound waves, they are preferred in situations for the following reasons: easily focused (i.e. directional, beam can be obtained with very little spreading); inaudible; high frequencies with shorter wavelengths allow investigation of very small structure (wavelength should be of the same order as the dimensions of the object); and, information obtained by ultrasound, particularly dynamic studies, cannot be acquired by any other convenient technique.

Transmission of ultrasound can be longitudinal, transverse or shear. For medical diagnostic applications, the longitudinal mode of wave propagation is normally used, since these waves propagate in all types of media (i.e. solids, liquids, gases). In longitudinal waves, the particles of the transmission medium oscillate away and towards the direction of propagation of the wave, resulting in alternate regions of compression and rarefaction.

The characteristic acoustic impedance determines the degree of reflection at the interface between two media. The approximate value of acoustic impedance of biological tissues is about $1.6 \times 10^5$ g/cm$^2$ s. The greater the difference in acoustic impedance the greater is the amount of reflected energy. For example the acoustic impedance of air and tissue are about 42.8 g/cm$^2$ s and $1.6 \times 10^5$ g/cm$^2$ s, respectively. Since this difference is so large most of the ultrasonic energy is reflected at the interface. Therefore a coupling agent/medium (e.g. olive oil, special cream) is required to minimize the energy reflection by providing an air-free path between the ultrasonic transducer and the tissue. The impedance varies over a range of 60 dB. Small changes in the impedance which are associated with soft tissue interfaces (as low as 1 ppm) are readily detected, resulting in excellent contrast sensitivity.

Echogenicity is one ultrasound imaging property that is important for mimicking real tissue in procedures using TRUS imaging. Echogenicity is the ability to create an echo, i.e. return a signal in ultrasound examinations. Echogenicity is important for creating contrast between different tissues. Differences in echogenicity between neighbouring tissues gives rise to the contrast necessary to differentiate between the tissues during a TRUS procedure. Echogenicity in a tissue phantom can be modified with the use of acoustic scattering particles, and, in the present invention, differences in echogenicity between neighbouring tissues has been successfully mimicked by using different amounts of acoustic scattering particles in neighbouring tissue phantoms.

Speed of propagation is a second ultrasound imaging property that is important for mimicking real tissue in procedures using TRUS imaging. Ultrasonic frequencies employed for medical applications range from 1 to 15 MHz. Ultrasonic energy is transmitted through a medium as a wave motion which does not create any net movement of the medium and the velocity of propagation of the wave motion is determined by the density and stiffness of the transmission medium. At a given temperature the density and stiffness of a tissue medium are relatively constant, which results in a constant sound velocity. Table 3 provides typical values of speed of propagation in tissues.

TABLE 3

Properties of Ultrasound in Human Tissues [7]

| Material | Speed of sound (m/s) | Impedance (kg m$^{-2}$ s$^{-1}$ × 10$^{-6}$) | Attenuation at 1 MHz (dB cm$^{-1}$) |
|---|---|---|---|
| Air (20° C.) | 343 | 4 × 10$^{-4}$ | 12.0 |
| Water | 1480 | 1.48 | 0.002 |
| Fat | 1450 | 1.38 | 0.6 |
| Brain | 1541 | 1.58 | 0.85 |
| Liver | 1549 | 1.65 | 0.9 |
| Kidney | 1561 | 1.62 | 1.0 |
| Blood | 1570 | 1.61 | 0.2 |
| Muscle | 1585 | 1.7 | 2.3 |
| Skull-bone | 4080 | 7.8 | 13.0 |
| Lens of eye | 1620 | 1.84 | 2.0 |
| Human soft tissue (average) | 1540 | 1.63 | 0.8 |
| Arterial tissue [5] | 1501-1532 | — | 6-15 (10 MHz) |
| Arterial [6] | 1579-1628 | — | 40 (30 MHz) |

Attenuation, which is the absorption of an ultrasound beam while passing through a medium, is a third ultrasound imaging property that is important for mimicking real tissue in procedures using TRUS imaging. Attenuation can be attributed to adsorption of the ultrasound beam by the medium and its deviation from the parallel by reflection, refraction, scattering, diffraction, etc. Relative intensity and attenuation of the ultrasound is expressed in decibels (dB), and the absorption coefficient, $\alpha$, is expressed in dB/cm. In soft tissues $\alpha$ depends strongly on frequency. Therefore, for the same energy loss, lower frequency ultrasound would travel further than higher frequency ultrasound. Table 3 provides listings of typical values of characteristic impedance and attenuation for various tissues. The average value of attenuation in soft tissues is about 1 dB/cm/MHz. In almost all cases, attenuation is approximately proportional to ultrasound frequency [4]. Table 4 provides a comparison of characteristics in human and canine prostate tissues.

TABLE 4

Ultrasound Properties of Humans and Canine Prostate Tissue

| | Human [6, 7] | Canine [11] |
|---|---|---|
| Speed of sound (m/s) | 1561 ± 22 | 1558 ± 17 |
| Attenuation (dB/cm-MHz) | 0.78 ± 0.24 | 0.84 ± 0.12 |

Table 5 provides speed of propagation data for a 7.5 MHz ultrasound beam in 15% w/w and 20% w/w PVA-C formulations having undergone 1, 3 and 6 freeze-thaw cycles (FTC). It is evident from comparing Table 5 with Tables 3 and 4 that the speed of propagation of ultrasound waves in PVA-C formulations matches well with the speed of propagation in prostate and other soft tissues.

TABLE 5

Speed of Propagation of Ultrasound in PVA Cryogels

| | Speed of Sound (m/s) | | |
|---|---|---|---|
| Composition | 1 FTC | 3 FTC | 6 FTC |
| 15% w/w PVA | 1500.29 ± 3.95 | 1512.17 ± 2.19 | 1537.85 ± 18.87 |
| 20% w/w PVA | 1539.12 ± 5.85 | 1531.49 ± 3.7 | 1586.31 ± 2.14 |

Figure 5A:
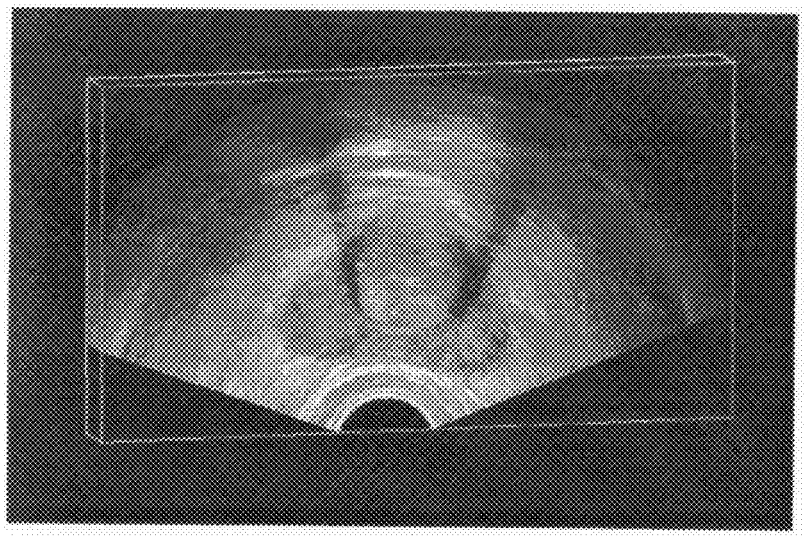
FIG. 5A depicts a transrectal ultrasound (TRUS) image of a human prostate gland.
Figure 5B:
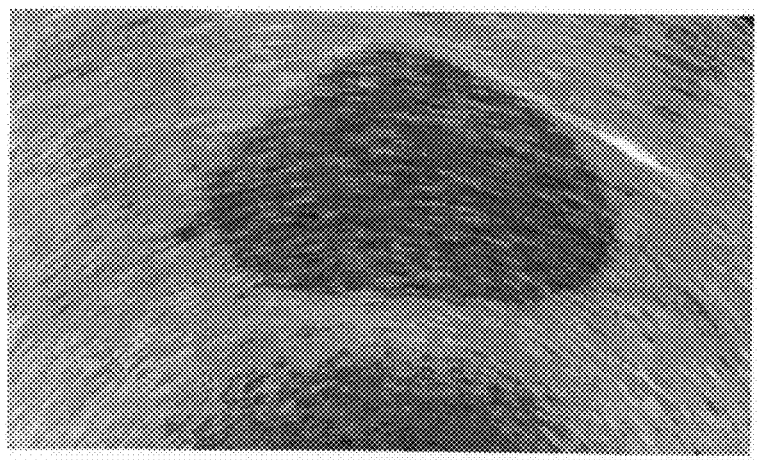
FIG. 5B depicts a transrectal ultrasound (TRUS) image of a prostate tissue phantom of the present invention.
Figure 6:
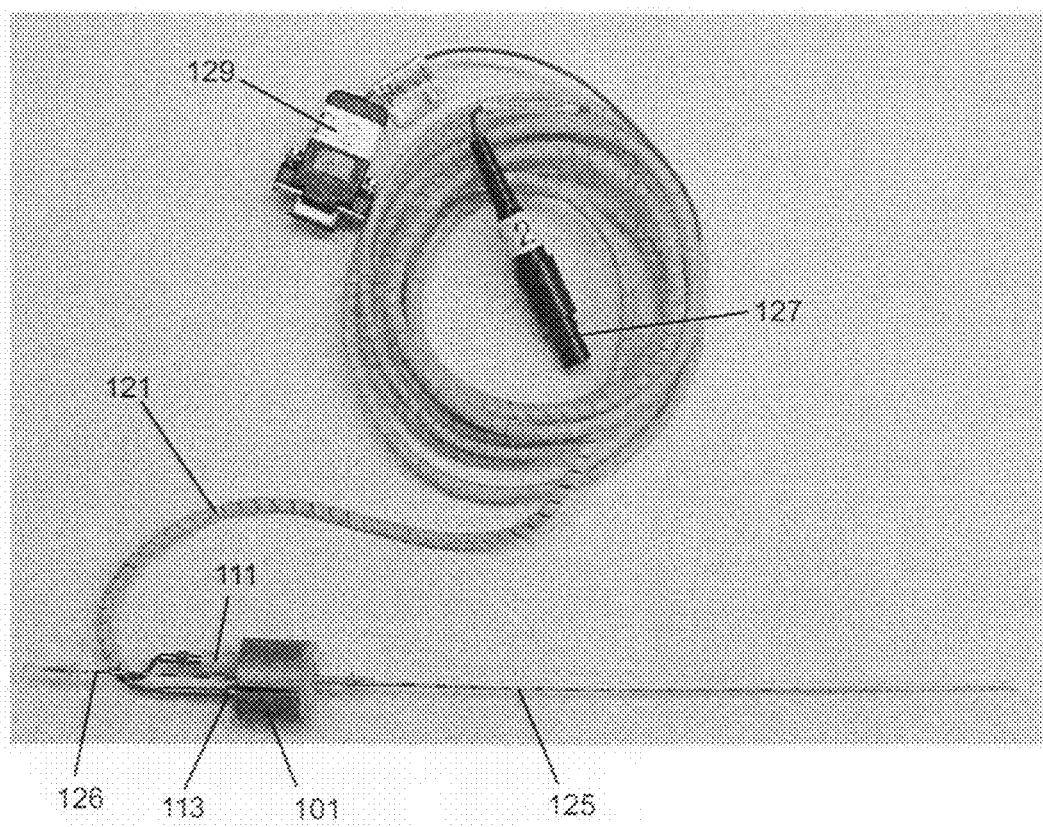
FIG. 6 is a picture of a needle attachment fixture (NAF) for holding a brachy needle and for simultaneously measuring needle position and needle penetration forces.
Figure 7:
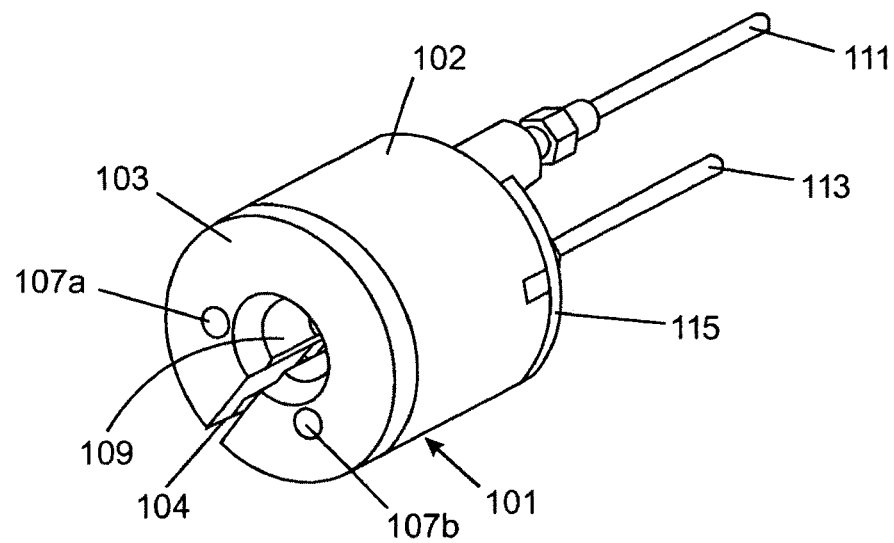
FIG. 7 is a front perspective view of the needle attachment fixture (NAF) depicted in FIG. 6.
Figure 8:
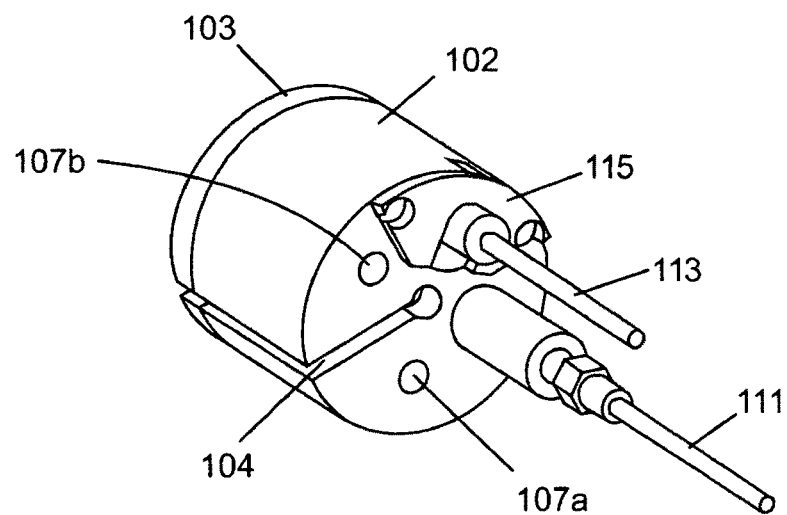
FIG. 8 is a rear perspective view of the NAF of FIG. 7.
Figure 9A:
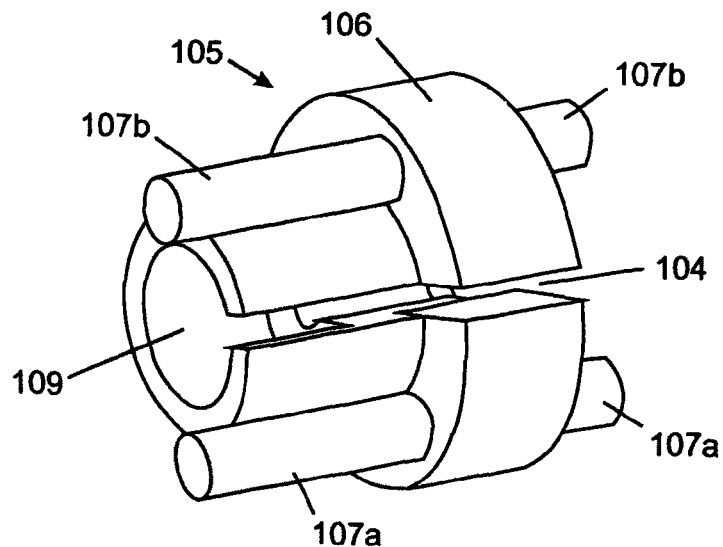
FIG. 9A is a front side perspective view of an internal slider and a needle connector of the NAF of FIG. 7; and, FIG. 9B depicts FIG. 9A in which a force and position sensor are also shown.
Figure 9B:
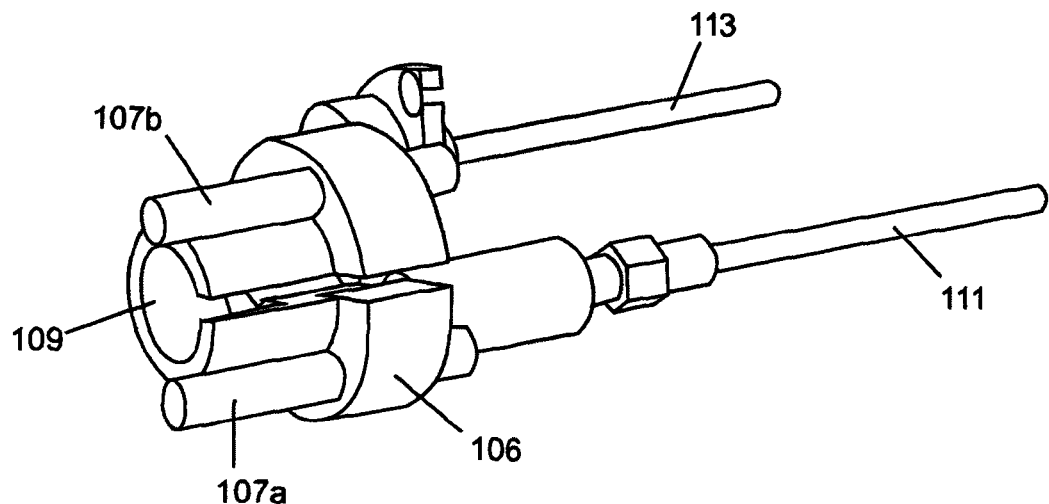

Referring to FIG. 5, a TRUS image of the prostate gland during prostate cancer brachytherapy is shown in FIG. 5A, while a TRUS image of the prostate tissue phantom of the present invention set in the perineal tissue phantom of the present invention is illustrated in FIG. 5B.

Thus, a phantom for prostate cancer brachytherapy constructed in accordance with the examples above has speeds of ultrasound propagation that are suitably within the range of real-life biological variation for the prostate gland and surrounding tissues, and has sufficient differences in echogenicity between neighbouring tissues to provide the ultrasound image contrast needed for TRUS.

Example 9

Needle Insertion Force and Track (NIFT) Measurement System with Needle Attachment Fixture (NAF)

A particular suitable apparatus is depicted in FIGS. 6-9 for measuring needle penetration properties as discussed in Example 7. In order to measure the forces with respect to depth of needle penetration, an apparatus was created that is suitable for use in patient cares areas (operating room) of hospitals. The Needle Insertion Force and Track (NIFT) measurement system simultaneously measures the needle penetration forces and needle position to represent a track of needle force versus depth into the body. A special needle attachment fixture (NAF) was designed and constructed that contained a load cell to measure force and a sensor for a magnetic tracking system (Aurora made by Northern Digital Inc.). The NAF attaches to the Luer-Lok™ connector on the hub of the standard brachytherapy needle. Calibrations and data integrity assessments were conducted periodically before cases.

With reference to FIGS. 6-9, components of the NAF include: enclosure 101 comprising housing 102 and front face plate 103; internal slider 105 comprising annular disk 106 and two rods 107a,107b; needle connector 109, position sensor 111; and, load cell 113. Needle connector 109 having Luer-Lok™ threads therein is bonded to annular disk 106 that slides on two rods 107a,107b. The annular disk moves within housing 102 until it contacts the tip of load cell 113. This mechanism transfers the force of needle penetration to the load cell for measurement of axial force (along the axis of the brachy needle). Enclosure 101 comprises two parts, housing 102 and front face plate 103 attached by a common screw thread, with a common slot 104. The slot accommodates stylette 126 that accompanies the needle when the stylette is partially withdrawn. Load cell 113 is mounted in a recess machined in a rear portion of enclosure 101 and held in place by a cover tab 115. A MagTrax™ screw (position sensor) 111 is threaded into a rod attached to a rear of enclosure 101. Holes in the front face plate and housing fix the ends of rods 107a,107b. When brachy needle 125 is inserted into a tissue, the needle hub transfers the force to connector 109 and annular disk 106 that slides on rods 107a,107b to contact load cell 113. Any needle with a Luer-Lok™ thread can be connected to the NAF and still function properly. The diameter of housing 102 depends on the diameter of force sensor. Force sensor 113 is offset from the central axis of brachy needle to accommodate stylette 126 inserted into the bore of the brachy needle and retracted from the hub. Cables from load cell 113 and position sensor 111 are wrapped in a plastic spiral wrap 121 to maintain control of the cables. The wrapping prevents tangling of the cables which would cause a serious problem or delay during set-up in the operating room. The position sensor cable terminates in a simple joiner 127 for attachment to a mating joiner outside the surgical field (lying on the floor). A load cell cable joiner 129 connects directly to a preamplifier at the joiner which provides power to the load cell, amplifies the sensor output, and converts the output to a voltage value. The distal end of the load cell joiner interfaces with an analogue to digital converter for input to a computer, which synchronizes the force with the position. In order to properly synchronize force and position, the track of the needle is accurately calculated by known methods. Advantageously, the NAF of the present invention permits simultaneous sensing of force and position, attaches to standard needles with a Luer-Lok thread on the hub, permits transfer of force from the needle to the force sensor, withstands sterilization by ETO and cleaning with most antiseptics, is compatible with commercial brachytherapy needles without requiring modification, is straightforward to attach/remove to/from the needle by the medical specialist, and accommodates normal insertion of the needle (straight, bi-directional, rapid pulsing) into the patient.

In operation, the NIFT is set-up prior to the start of the brachytherapy procedure. The NAF is sterilized prior to each case. For each instrumented needle the urologist inserts the hub of the brachytherapy needle into the NAF and latches the needle into place. The urologist holds only the NAF while inserting the brachytherapy needle through the template into the patient. The operator of the NIFT initiates recording when the urologist has connected the needle into the NAF. The NIFT records both the force and position at the hub of the brachytherapy needle. Although the needle may bend during insertion, there remains a fixed distance between the hub and the tip of the needle.

REFERENCES

The contents of the entirety of each of which are incorporated by this reference.
1. National Cancer Institute of Canada: Canadian Cancer Statistics 2002. Available at www.cancer.ca/english/RS_CanCanStats.asp.
2. Merrick G S, Butler W M, Lief J H, Dorsey A T. Is brachytherapy comparable with radical prostatectomy and external-beam radiation for clinically localized prostate cancer? *Tech Urol.* 2001 March; 7(1):12-9. Review.
3. Blasko J C, Mate T, Sylvester J E, Grimm P D, Cavanagh W. Brachytherapy for carcinoma of the prostate: techniques, patient selection, and clinical outcomes. *Semin Radiat Oncol* 2002 January; 12(1):81-94. Review.
4. Chivers and Hill, *Ultrasound in Med and Biology,* 2:25 (1975).
5. Greenleaf J, Duck F, Sabayon W, Johnson S. Ultrasonic data acquisition and processing system for atherosclerotic tissue characterization. *Proc.* 1074 *Ultrasonic Sump, pp* 738-743 (1974).
6. Lockwood G, Ryan L, Hunt J, Foster F. Measurement of the ultrasonic properties of vascular tissues and blood from 35-65 MHz. *Ultrasound Med Boil* 17, 653-666 (1991).
7. Khandpur R S, *Biomedical Instrumentation Technology and Applications,* McGraw-Hill, 2005.
8. Parker, K, Huang S, Lerner R, Lee Jr F, Rubens D, Roach D. Elastic and Ultrasound Properties of the prostate. *Ultrasonics Symposium (IEEE),* 1993, pp 1035-1038.
9. D'Souza W D, Madsen E L, Unal O, Vigen K K, Frank G R, Thomadsen B R. Tissue mimicking materials for a multi-imaging modality prostate phantom. *Med. Phys.* 2001 April; 28(4): 688-700.
10. Paliwal B R, Rifler M A, McNutt T R, Mackie T R, Thomadsen B R, Purdy J A, Kinsella T J. A solid water pelvic and prostate phantom for imaging, volume rendering, treatment planning, and dosimetry for an RTOG multi-institutional, 3-D dose escalation study. *Int. J. Radiat. Oncol. Biol. Phys.* 1998 Aug. 1; 42(1):205-11.

11. Holmes III D, Davis B, Bruce C, Wilson T, Robb R. Trans-urethral ultrasound imaging of the prostate for applications in prostate brachytherapy: Analysis of phantom and in vivo data. *Proceedings of SPIE The International Society for Optical Engineering*. v 4319, 2001 p 46-52.
12. Radford D A, Followill D S, Hanson W F. Design of an anthropomorphic intensity modulated radiation therapy quality assurance phantom. 22*nd Annual International Conference of the IEEE Engineering in Medicine and Biology Society*. Chicago, USA.
13. Chu K C, Rult B K. Polyvinyl alcohol cryogel: an ideal phantom material for MR studies of arterial flow and elasticity. *Magn. Reson. Med.* 1997 February; 37(2):314-9.
14. Mitchell M D, Kundel H L, Axel L, Joseph P M. Agarose as a tissue equivalent phantom material for NMR imaging. *Magn. Reson. Imaging.* 1986; 4(3):263-6.
15. Madsen E L, Frank G R, Dong F. Liquid or solid ultrasonically tissue-mimicking materials with very low scatter *Ultrasound. Med. Biol.* 1998 May; 24(4):535-4.
16. Web—CIRS www.cirsinc.com/.
17. Peppas N A. *Biomaterials Science: An Introduction to Materials in Medicine.* Ratner B D, Hoffman A S, Schoen F J, Lemons J E. eds. Academic Press Inc Toronto 1996:62.
18. Ratner B D, Hoffman A S. Synthetic Hydrogels for Biomedical Applications, in *Hydrogels for Medical and Related Applications*, Andrade J D, ACS Symposium Series, American Chemical Society, Washington; 1985; 31:14.
19. Bray J C, Marty E W. PVA hydrogel for synthetic articular cartilage material. *J. Biomed Mater Res.* 1973; 7:431.
20. Watase M, Nishinari K, Nambu M. Anomalous Increase of the Elastic Modulus of Frozen Poly (Vinyl Alcohol) gels. *Cryo-Letters.* Cambridge, Mass1983; 4:197-200.
21. Peppas N A, Stauffer S R. Reinforced uncrosslinked poly (vinyl alcohol) gels produced by cyclic freezing-thawing processes: a short review. *Journal of Controlled Release* 1991; 16:305-310.
22. Stauffer S R, Peppas N A. Poly (vinyl alcohol) hydrogels prepared by freezing-thawing cyclic processing. *Polymer* 1992; 33:3932-3936.
23. Wan W, Campbell G, Zhang Z, Hui A, Boughner D. Optimizing the Tensile Properties of Polyvinyl Alcohol Hydrogel by the Freeze-Thaw Process for Bioprosthetic Heart Valve Stent. *J. Biomed. Mater. Res. (Applied Biomater).* 2002; 63:854-861.
24. Campbell G, Wan W. The Synthesis of Polyvinyl Alcohol Cryogel as an Implant Biomaterial. *Proceedings of 2002 NRC-NSC Canada-Taiwan Joint Workshop on Advanced Manufacturing Technologies*, September 2002, pgs. 137-144.
25. Berry E, Brown J M, Connell M, Craven C M, Efford N D, Radjenovic A, Smith M A. Preliminary experience with medical applications of rapid prototyping by selective laser sintering. *Med Eng Phys.* 1997 January; 19(1):90-6.
26. Aung S C, Tan B K, Foo C L, Lee S T. Selective laser sintering: application of a rapid prototyping method in cranio-maxillofacial reconstructive surgery. *Ann Acad Med Singapore.* 1999 September; 28(5):739-43.
27. Berry E, Marsden A, Dalgarno K W, Kessel D, Scott D J. Flexible tubular replicas of abdominal aortic aneurysms. *Proc Inst Mech Eng [H].* 2002; 216(3):211-4.
28. Khandpur R S. *Biomedical Instrumentation (technology and application).* Ultrasonic Imaging Systems, 2005; pg. 623.
29. Panametrics-NDT Ultrasonic transducers. Retrieved June 2005 from: www.panametrics-ndt.com/ndt/ndt_transducers/index.html.
30. AIUM (American institute of ultrasound in medicine). Methods for Specifying Acoustic Properties of Tissue Mimicking Phantoms and Objects, 1995.
31. Madsen E L, Zagzebski J A, Banjavie R A, Jutila R E. Tissue Mimicking Materials for Ultrasound Phantoms. *Med. Phys.* September/October 1978; 5(5).
32. Madsen E, Zagzebski J, Banjavic R, Burlew M. Phantom Material and Method. U.S. Pat. No. 4,277,367 (Jul. 7, 1981).
33. Madsen E, Zagzebski J, Frank G. Ultrasound Phantom. U.S. Pat. No. 4,843,866 (Jul. 4, 1989).
34. Madsen E, Frank G. Very Low Scatter liquid and Solid Tissue Mimicking Material for Ultrasound Phantoms and Method of Making the Same. U.S. Pat. No. 5,625,137 (Apr. 29, 1997).
35. Madsen E, Frank G. Method of Making a Solid Tissue Mimicking Material for Ultrasound Phantoms. U.S. Pat. No. 5,902,748 (May 11, 1999).
36. Madsen E, D'Souza W, Frank G. Multi-imaging Modality Tissue Mimicking Materials for Imaging Phantoms, U.S. Pat. No. 6,318,146 (Nov. 20, 2001).
37. Madsen E, Zagzebski J, Frank G. Multi-imaging Modality Tissue Mimicking Materials for Imaging Phantoms. U.S. Patent Publication 2002/0012999 (Jan. 31, 2002).
38. Madsen E, Frank G. Liquid and Solid Tissue Mimicking Material for Ultrasound Phantoms and Method of Making the Same. U.S. Pat. No. 6,352,860 (Mar. 5, 2002).
39. Madsen E, Frank G. Liquid and Solid Tissue Mimicking Material for Ultrasound Phantoms and Method of Making the Same. PCT publication WO 02/40985 (May 23, 2002).
40. Madsen E, D'Souza W, Frank G. Multi-imaging Modality Tissue Mimicking Materials for Imaging Phantoms. U.S. Pat. No. 6,635,486 (Oct. 21, 2003).
41. Madsen E, Frank G. Tissue Mimicking Elastography Phantoms. U.S. Patent Publication 2004/0067591 (Apr. 8, 2004).
42. Ophir J, Maklad N, Jaeger P. Ultrasound Phantom. U.S. Pat. No. 4,286,455 (Sep. 1, 1981).
43. Gurvich V. Test Phantom for Information Systems and Methods of Use. U.S. Pat. No. 5,994,900 (Nov. 30, 1999).
44. Pagoulatos N, Haynor D, Edwards W, Kim Y. Apparatus and Method for Interactive 3D Registration of Ultrasound and Magnetic Resonance Images Based on a Magnetic Position Sensor. U.S. Pat. No. 6,775,404 (Aug. 10, 2004).
45. Lopez H, Smith W. Contrast Resolution Tissue Equivalent Ultrasound Test Object. U.S. Pat. No. 4,331,021 (May 25, 1982).
46. Flax S. Method for Evaluating Imaging Capabilities of an Ultrasound System. U.S. Pat. No. 5,656,763 (Aug. 12, 1997).
47. Zerhouni M, Rachedine M. Ultrasonic Calibration Material and Method. U.S. Pat. No. 5,196,343 (Mar. 23, 1993).
48. Fromageau J, Gennisson J-L, Schmitt C, Maurice R L, Mongrain R, Cloutier G. Estimation of Polyvinyl Alcohol Cryogel Mechanical Properties with Four Ultrasound Elastography Methods and Comparison with Gold Standard Testing. *IEEE Transaction on Ultrasonics, Ferroelectrics, and Frequency Control*, March 2007, vol. 54(3), pgs. 498-509.
49. Hassan C A, Peppas M A. Structure and Applications of poly (vinyl alcohol) hydrogels produced by conventional cross-linking or by freezing/thawing methods. *Adv. Polymer Sci.* 2000, vol. 153, pgs 37-65.
50. Podder T, Sherman J, Clark D, Messing E, Rubens, Strang, Liao L, Brasacchio, Zhang Y, Ng W, Yu Y. Evaluation of robotic needle insertion in conjunction with in vivo manual insertion in the operating room. *IEEE International Workshop on Robots and Human Interactive Communication.* 2005, pp 66-72.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A phantom for prostate cancer brachytherapy comprising:
   (a) a prostate tissue phantom having a shape of a real prostate gland, the prostate tissue phantom comprising a polyvinyl alcohol cryogel having undergone 3-5 freeze-thaw cycles and having 10-20% w/w polyvinyl alcohol in a solvent, 4-8% w/w oil and an amount of acoustic scattering particles to ultrasonically distinguish the prostate tissue phantom from its surroundings;
   (b) a perineal tissue phantom surrounding the prostate tissue phantom, the perineal tissue phantom comprising a polyvinyl alcohol cryogel having undergone 1-2 freeze-thaw cycles and having 10-20% w/w polyvinyl alcohol in a solvent, 4-8% w/w oil and an amount of acoustic scattering particles to ultrasonically distinguish the perineal tissue phantom from its surroundings;
   (c) a skin tissue phantom separating all or part of the perineal tissue phantom from an outside environment, the skin tissue phantom comprising a polyvinyl alcohol cryogel having undergone at least 6 freeze-thaw cycles and having 15-25% w/w polyvinyl alcohol in a solvent; and,
   (d) an enclosure for containing the prostate tissue phantom, the perineal tissue phantom and the skin tissue phantom.

2. The phantom for prostate cancer brachytherapy according to claim 1, further comprising a urethra tissue phantom in an anatomically correct position with respect to the prostate tissue phantom.

3. The phantom for prostate cancer brachytherapy according to claim 2, wherein the urethra tissue phantom comprises a polyvinyl alcohol cryogel having undergone at least 5 freeze-thaw cycles and having 10-20% w/w polyvinyl alcohol in a solvent and 5-20% w/w acoustic scattering particles.

4. The phantom for prostate cancer brachytherapy according to claim 3, wherein the urethra tissue phantom comprises a polyvinyl alcohol cryogel having undergone at least 6 freeze-thaw cycles having 15% w/w polyvinyl alcohol, and 9% w/w cellulosic acoustic scattering particles.

5. The phantom for prostate cancer brachytherapy according to claim 1, wherein the solvents comprise water.

6. The phantom for prostate cancer brachytherapy according to claim 1, wherein the oils comprise castor oil or mineral oil.

7. The phantom for prostate cancer brachytherapy according to claim 1, wherein the polyvinyl alcohol cryogel of the prostate tissue phantom underwent 4 freeze-thaw cycles and has 0.1-1% w/w acoustic scattering particles and the polyvinyl alcohol cryogel of the perineal tissue phantom underwent 1 freeze-thaw cycle and has 2-10% w/w acoustic scattering particles.

8. The phantom for prostate cancer brachytherapy according to claims 1, wherein
   the polyvinyl alcohol cryogel of the prostate tissue phantom underwent 4 freeze-thaw cycles and has 15% w/w polyvinyl alcohol, 6% w/w castor oil and 0.5 wt % cellulosic acoustic scattering particles,
   the polyvinyl alcohol cryogel of the perineal tissue phantom underwent 1 freeze-thaw cycle and has 15% w/w polyvinyl alcohol, 6% w/w castor oil and 3% w/w cellulosic acoustic scattering particles, and
   the polyvinyl alcohol cryogel of the skin tissue phantom has 20% w/w polyvinyl alcohol.

9. The phantom for prostate cancer brachytherapy according to claim 1, wherein one or more of the tissue phantoms comprises a biocide.

10. A prostate tissue phantom having a shape of a real prostate gland, the prostate tissue phantom comprising a polyvinyl alcohol cryogel having undergone 3-5 freeze-thaw cycles and having 10-20% w/w polyvinyl alcohol in a solvent, 4-8% w/w oil and 0.1-1% w/w acoustic scattering particles, weights based on total weight of the cryogel.

11. The prostate tissue phantom according to claim 10 having undergone 4 freeze-thaw cycles and having 15% w/w polyvinyl alcohol in water, 6% w/w castor oil or mineral oil and 0.5% w/w cellulosic acoustic scattering particles.

12. A perineal tissue phantom comprising a polyvinyl alcohol cryogel having undergone 1-2 freeze-thaw cycles and having 10-20% w/w polyvinyl alcohol in a solvent, 4-8% w/w oil and 2-10% w/w acoustic scattering particles, weights based on total weight of the cryogel.

13. The perineal tissue phantom according to claim 12 having undergone 1 freeze-thaw cycle and having 15% w/w polyvinyl alcohol in water, 6% w/w castor oil or mineral oil and 3% w/w cellulosic acoustic scattering particles.

14. A skin tissue phantom comprising a polyvinyl alcohol cryogel having undergone at least 6 freeze-thaw cycles and having 15-25% w/w polyvinyl alcohol in a solvent.

15. The skin tissue phantom according to claim 14 having 20% w/w polyvinyl alcohol in water.

16. A method of producing a phantom for prostate cancer brachytherapy comprising:
   (a) providing an enclosure;
   (b) positioning a polyvinyl alcohol cryogel-based skin tissue phantom in the enclosure over an area through which a brachytherapy needle can be inserted;
   (c) positioning a polyvinyl alcohol cryogel-based prostate tissue phantom in the enclosure in correct anatomical orientation to the skin tissue phantom and a transrectal ultrasound for a brachytherapy procedure;
   (d) introducing a polyvinyl alcohol solution into the enclosure to surround the prostate tissue phantom; and,
   (e) subjecting the enclosure and its contents to at least one freeze-thaw cycle to create a polyvinyl alcohol cryogel-based perineal phantom from the polyvinyl alcohol solution.

* * * * *